July 26, 1960 M. J. H. STAAR 2,946,594
PHONOGRAPHS
Filed Feb. 9, 1954 13 Sheets-Sheet 1
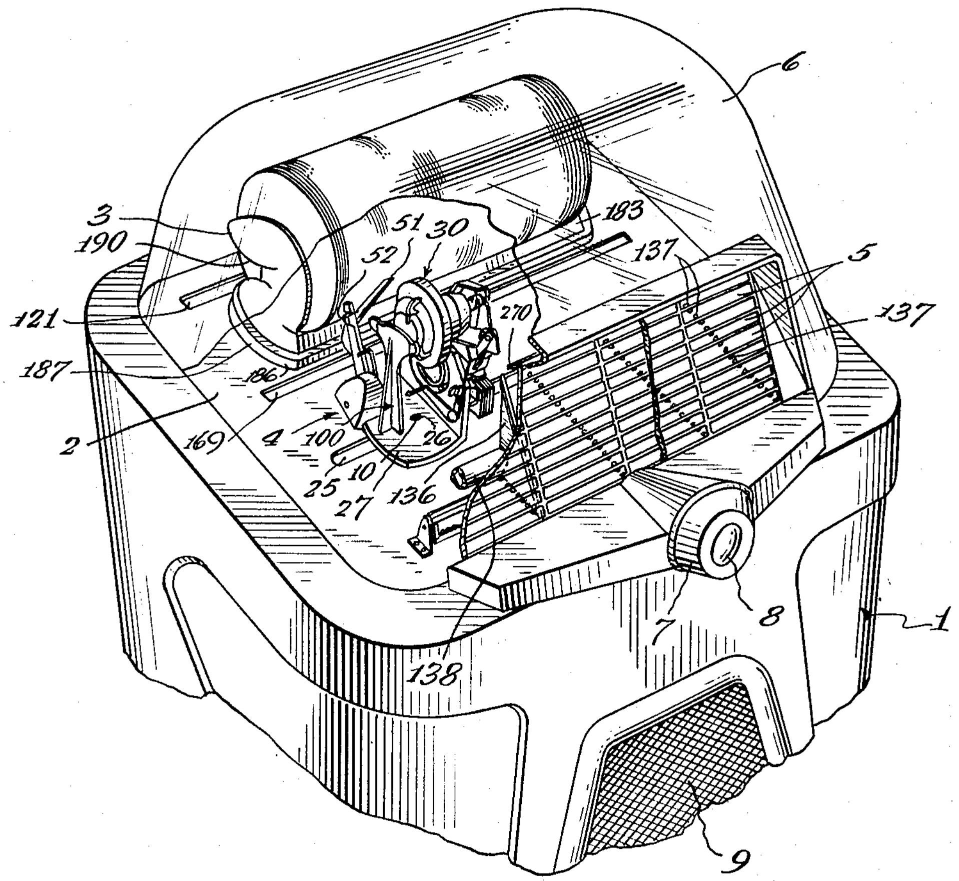
Inventor
Marcel Jules Helene Staar
By John F. Eakins
Attorney July 26, 1960 M. J. H. STAAR 2,946,594
PHONOGRAPHS
Filed Feb. 9, 1954 13 Sheets-Sheet 2
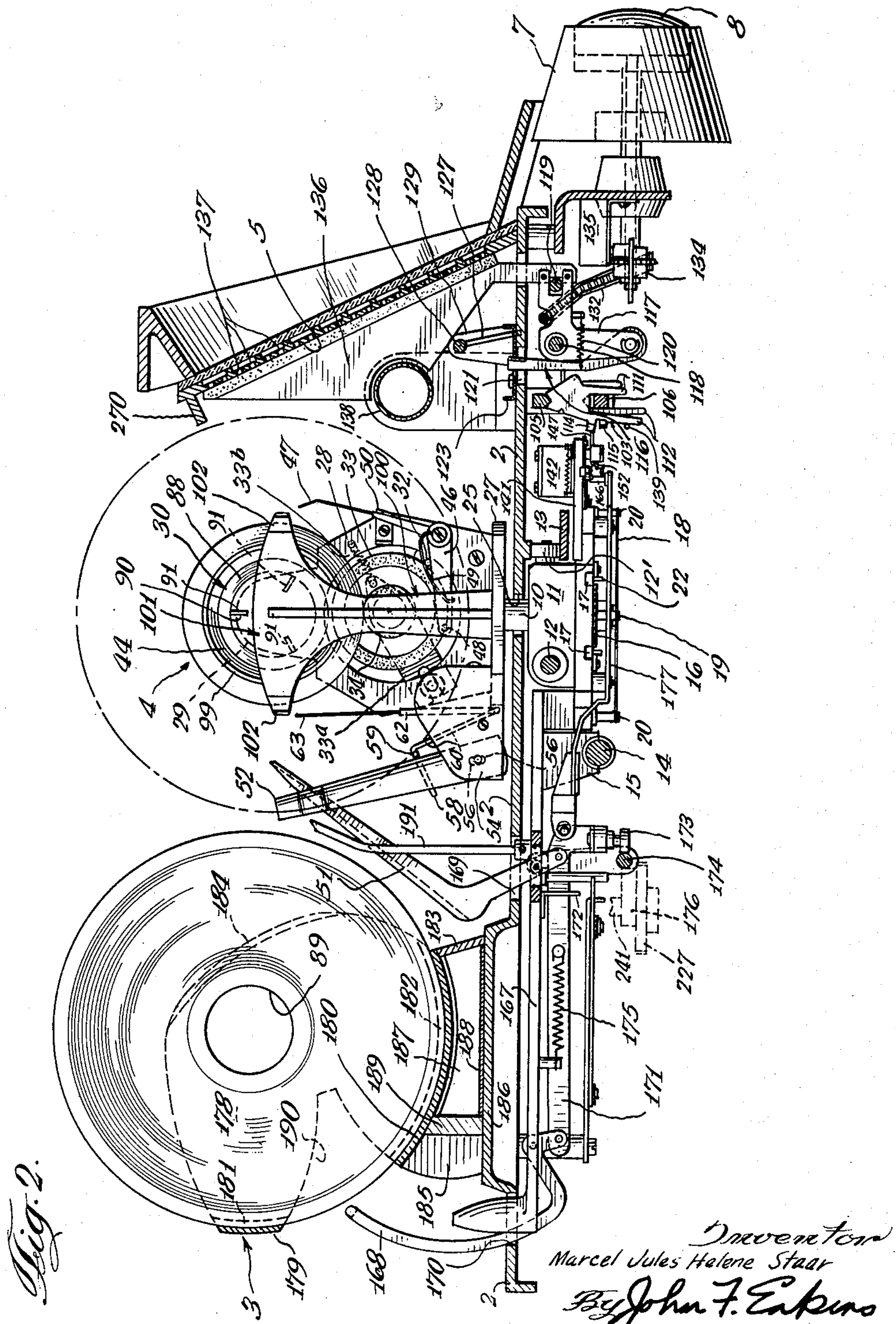

PHONOGRAPHS
Filed Feb. 9, 1954 13 Sheets-Sheet 3
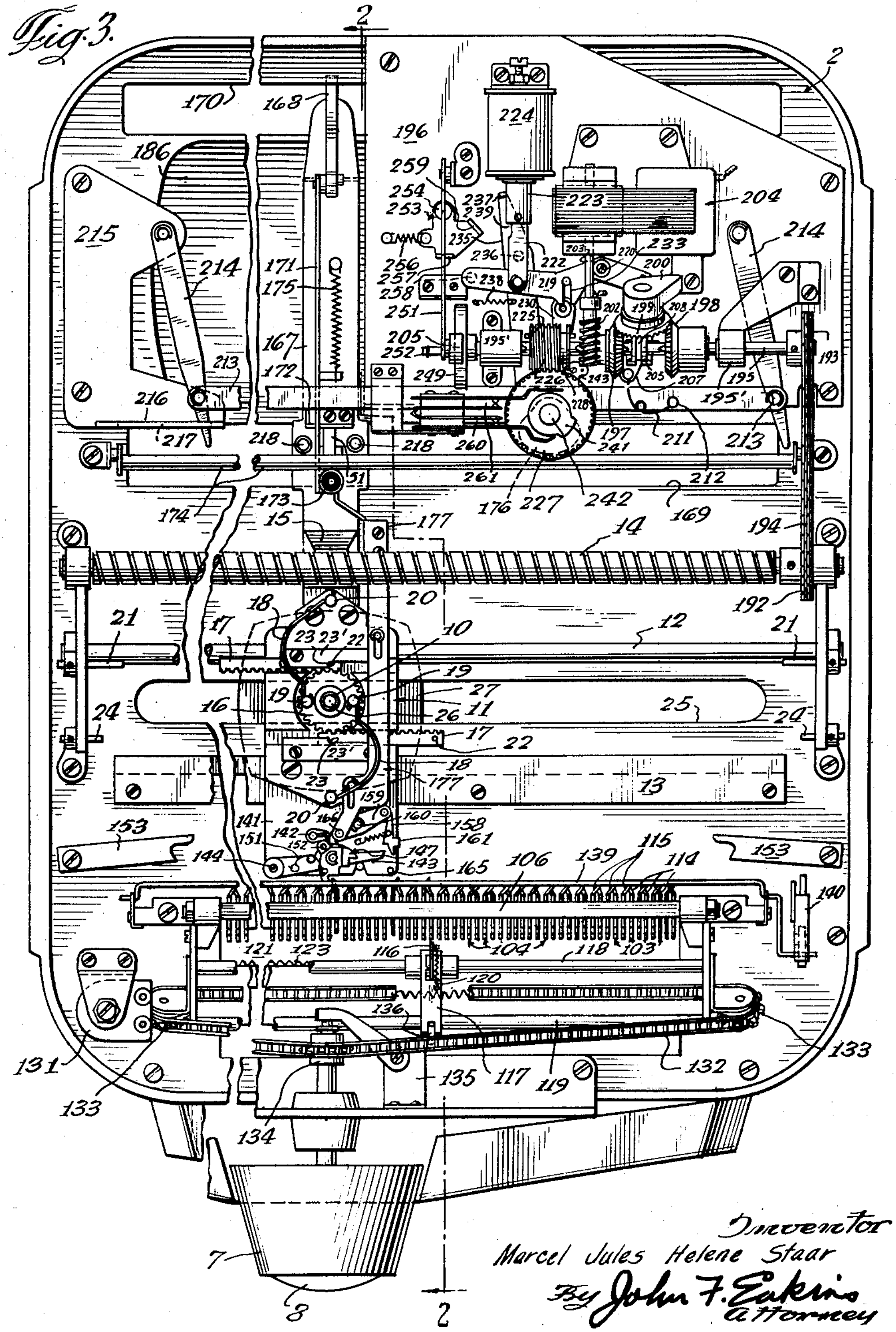

July 26, 1960 M. J. H. STAAR 2,946,594
PHONOGRAPHS
Filed Feb. 9, 1954 13 Sheets-Sheet 4
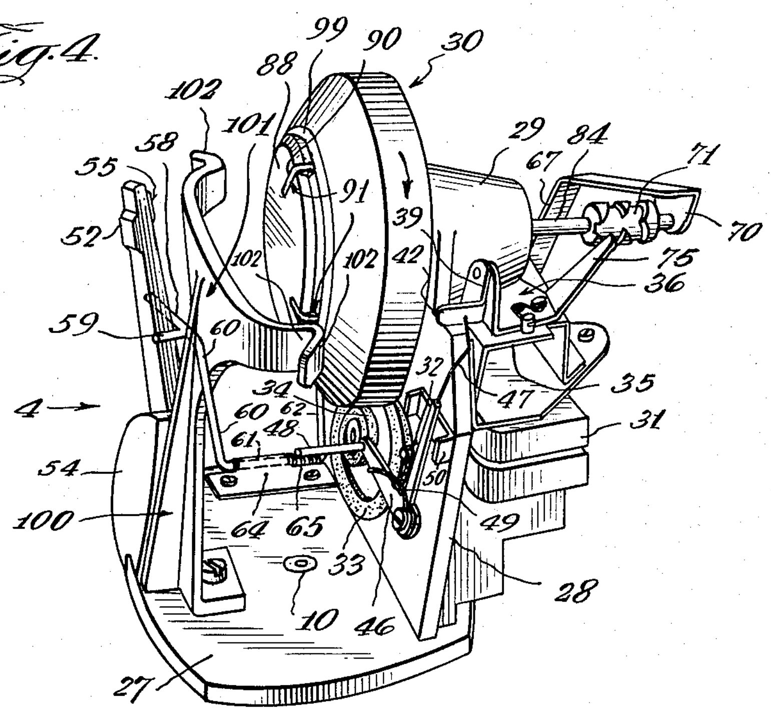
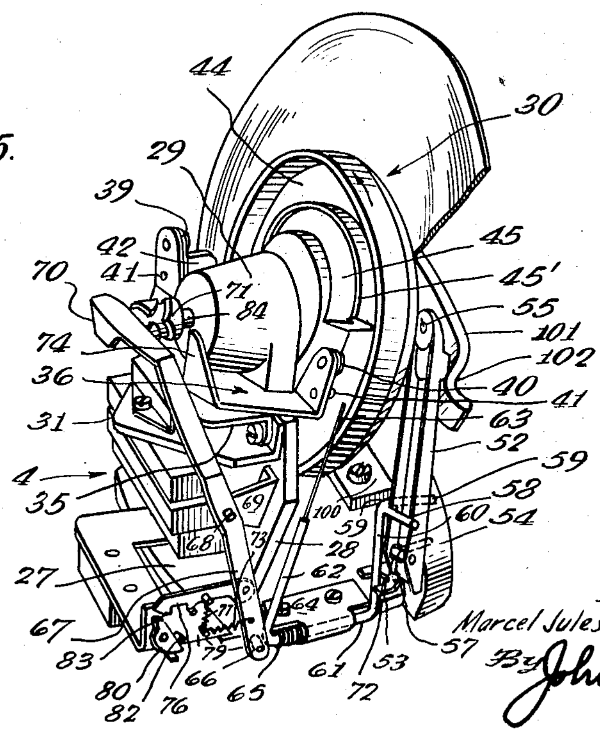
Inventor
Marcel Jules Helene Staar
By John F. Eakins
Attorney July 26, 1960 M. J. H. STAAR 2,946,594
PHONOGRAPHS
Filed Feb. 9, 1954 13 Sheets-Sheet 5
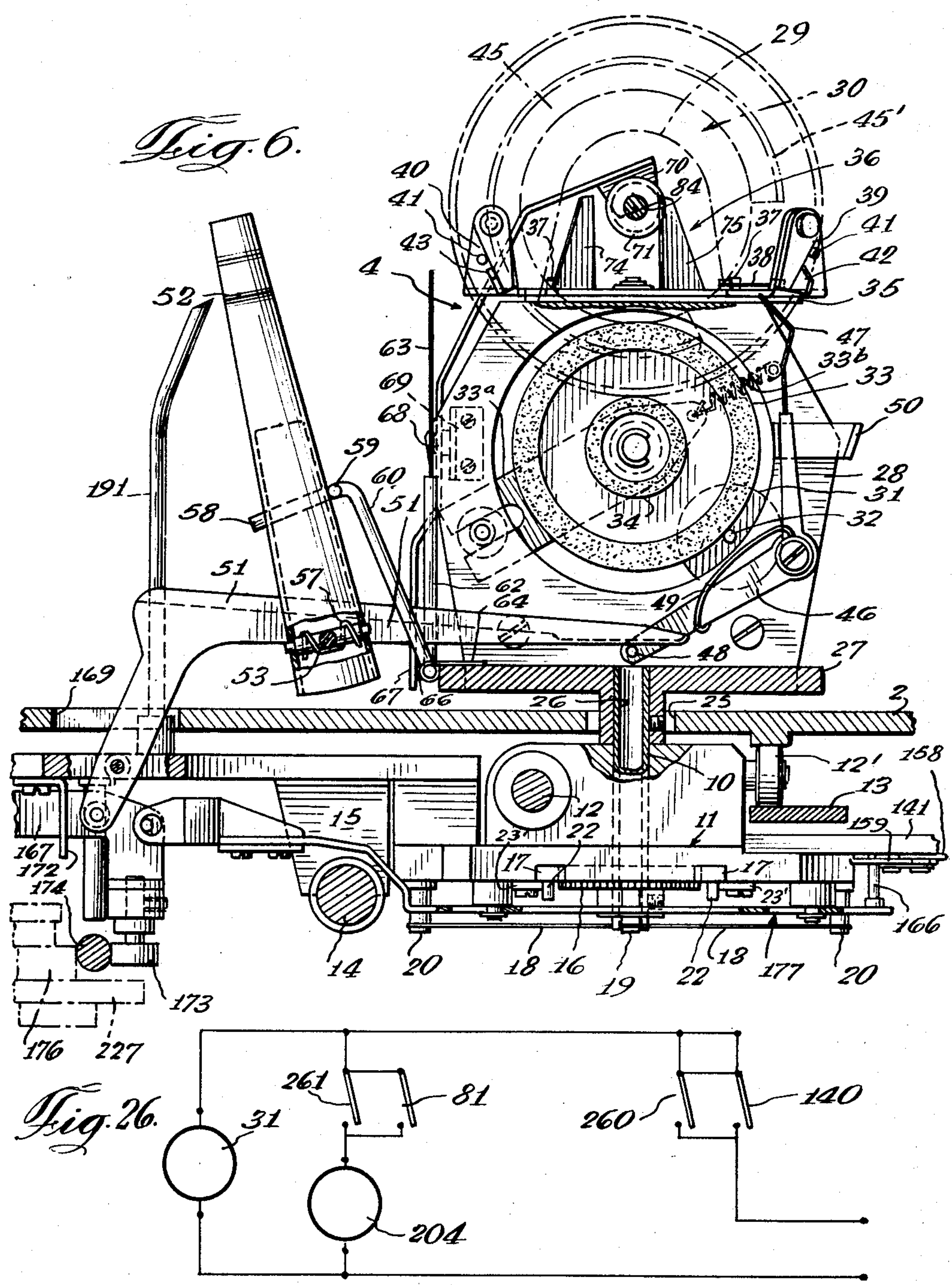
Inventor
Marcel Jules Helene Staar
By John F. Eakins
Attorney July 26, 1960 M. J. H. STAAR 2,946,594
PHONOGRAPHS
Filed Feb. 9, 1954 13 Sheets-Sheet 6
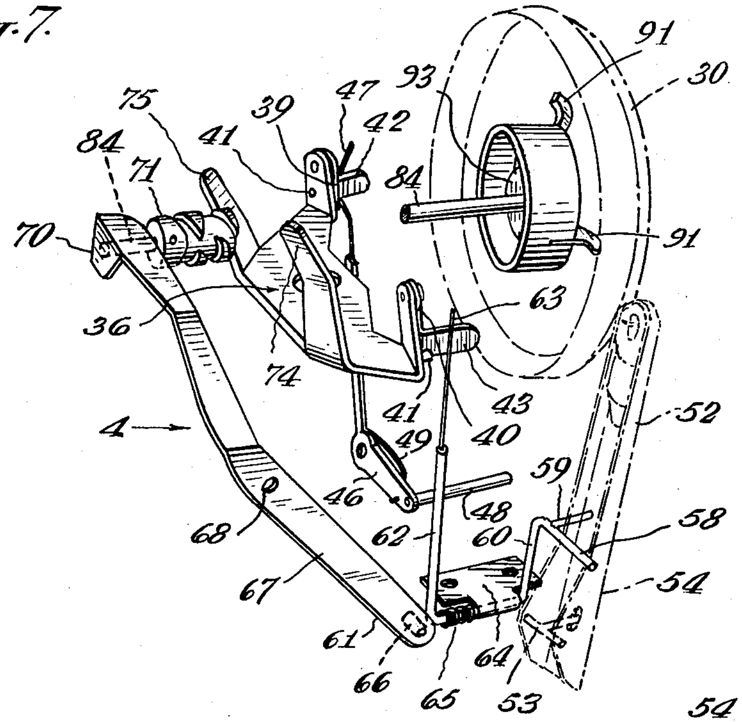
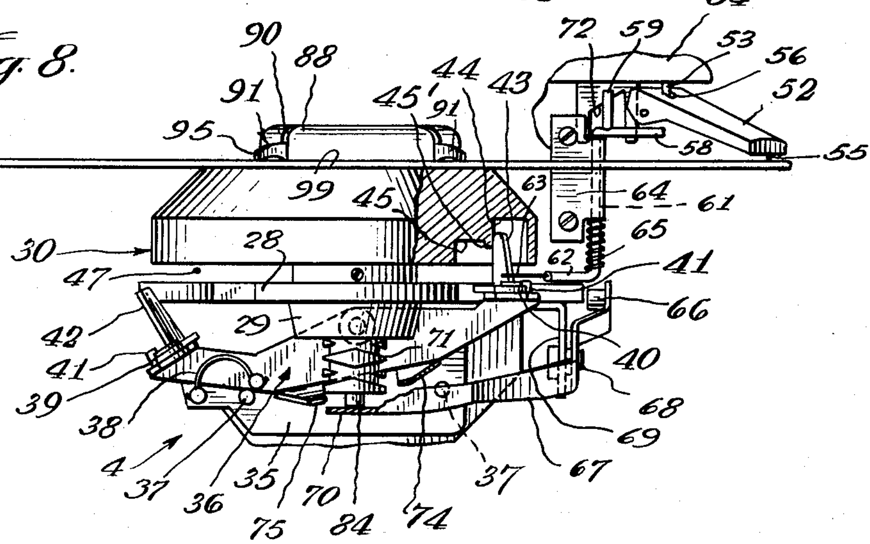
Inventor
Marcel Jules Helene Staar
By John F. Eakins
Attorney PHONOGRAPHS
Filed Feb. 9, 1954 13 Sheets-Sheet 7
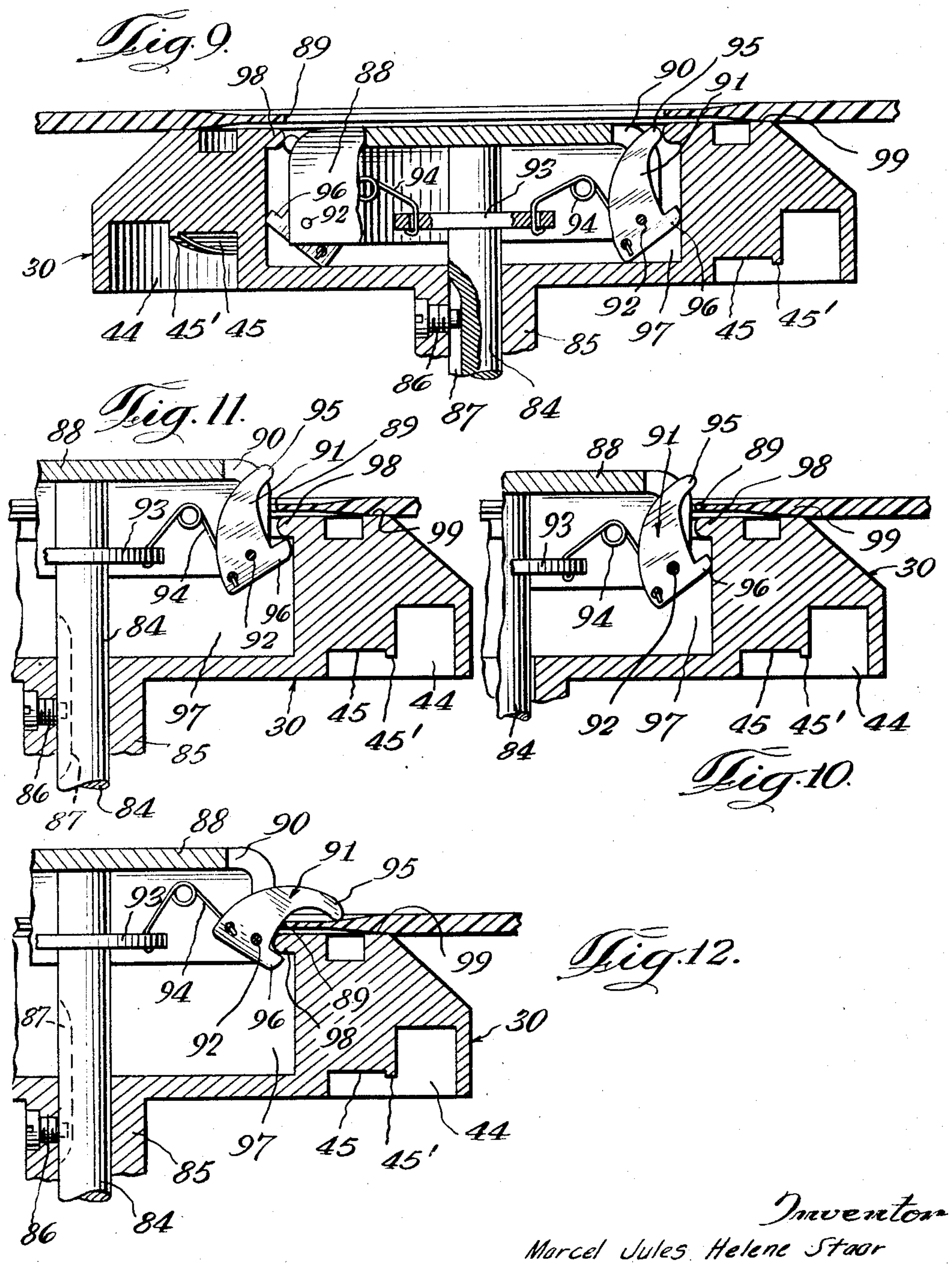
Inventor
Marcel Jules Helene Staar
By John F. Eakins
Attorney July 26, 1960 M. J. H. STAAR 2,946,594
PHONOGRAPHS
Filed Feb. 9, 1954 13 Sheets-Sheet 8
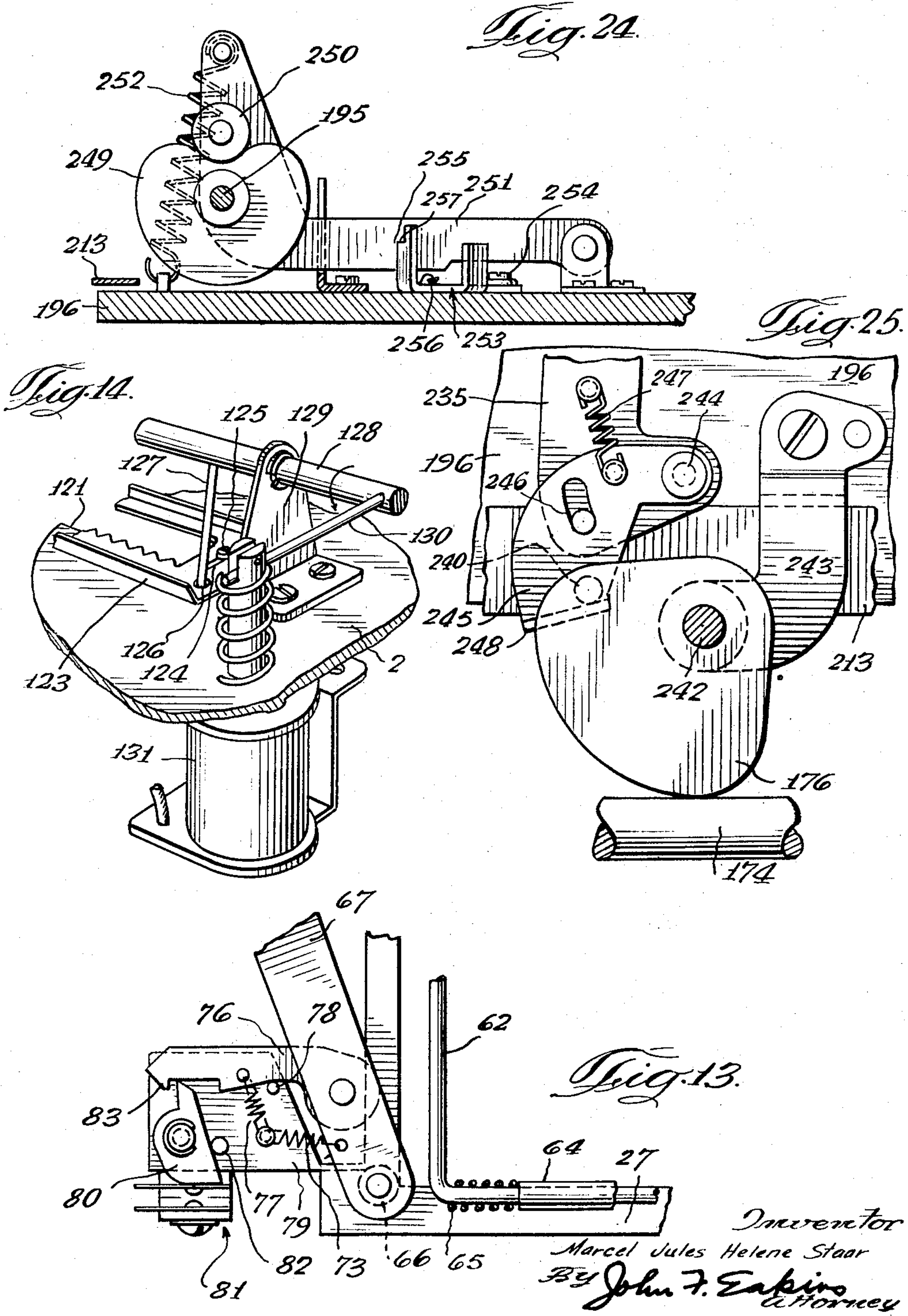
Inventor
Marcel Jules Helene Staar
By John F. Eakins
Attorney July 26, 1960 M. J. H. STAAR 2,946,594

PHONOGRAPHS

Filed Feb. 9, 1954

Inventor
Marcel Jules Helene Staar
By John F. Eakins
Attorney

July 26, 1960
M. J. H. STAAR
2,946,594
PHONOGRAPHS
Filed Feb. 9, 1954
13 Sheets-Sheet 10
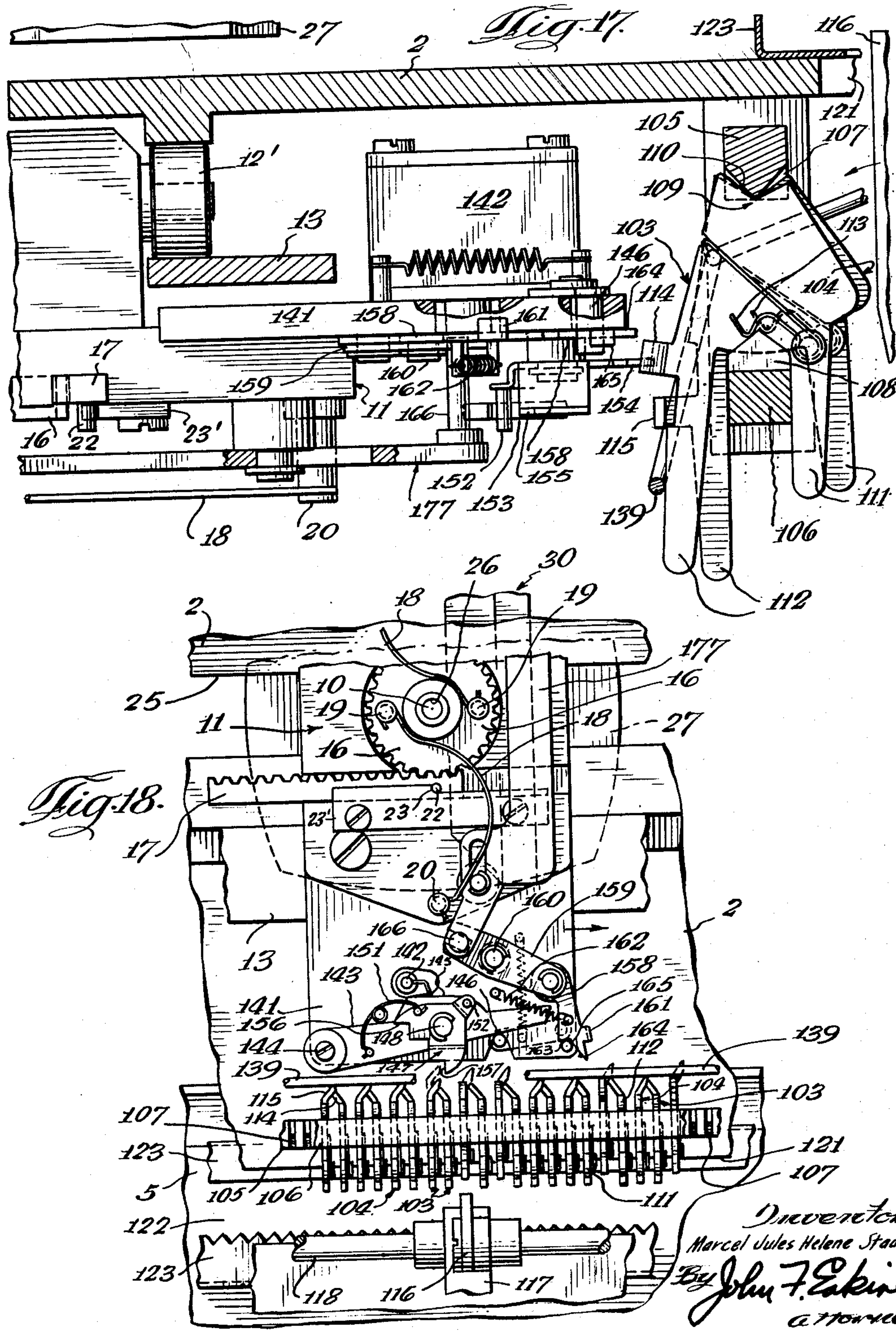

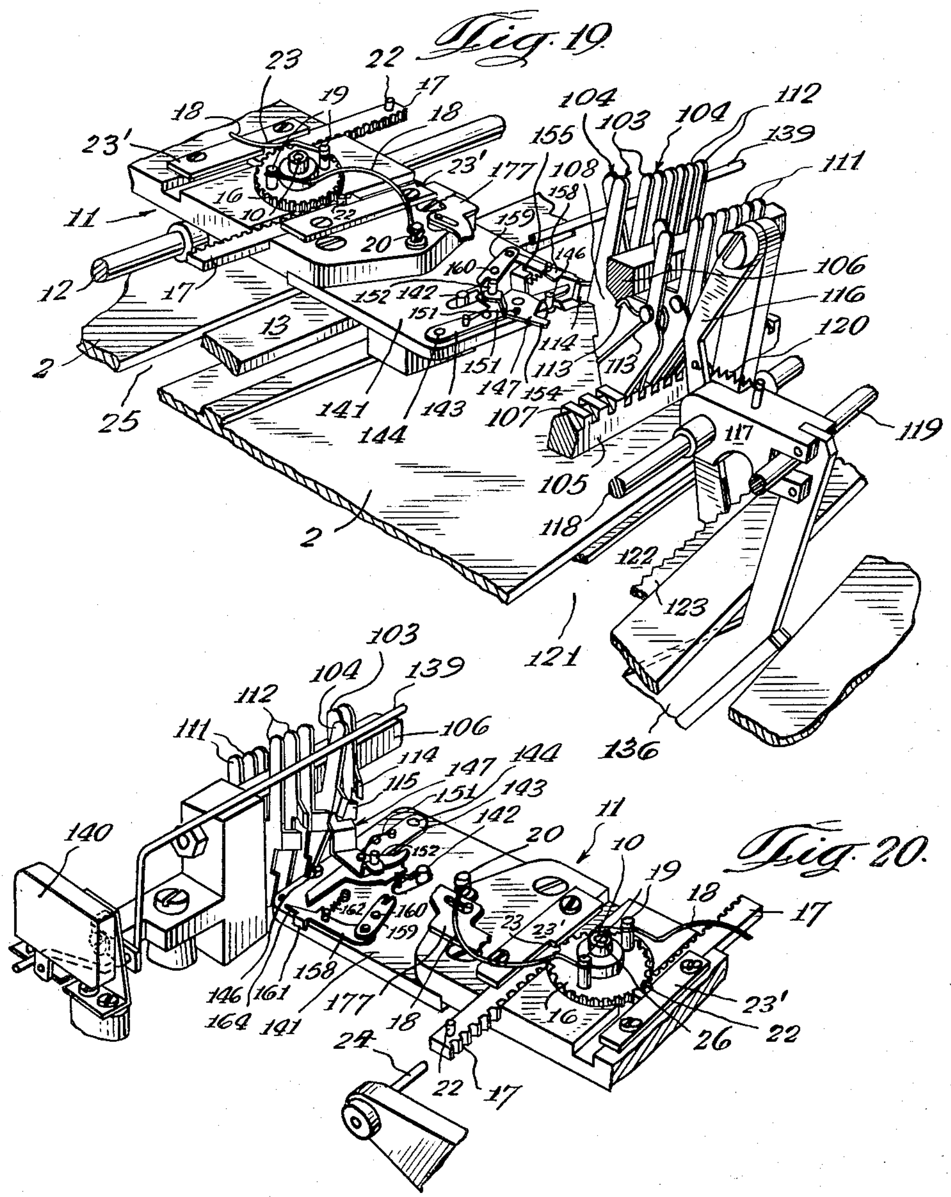
Inventor
Marcel Jules Helene Staar
By John F. Eakins
Attorney

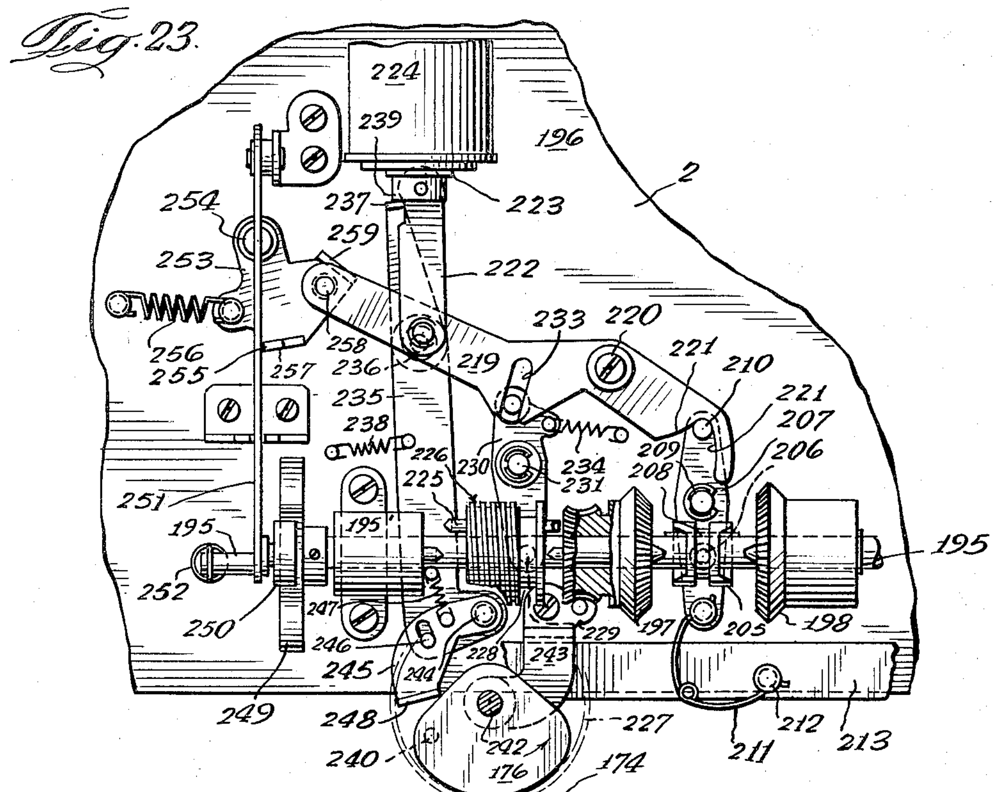
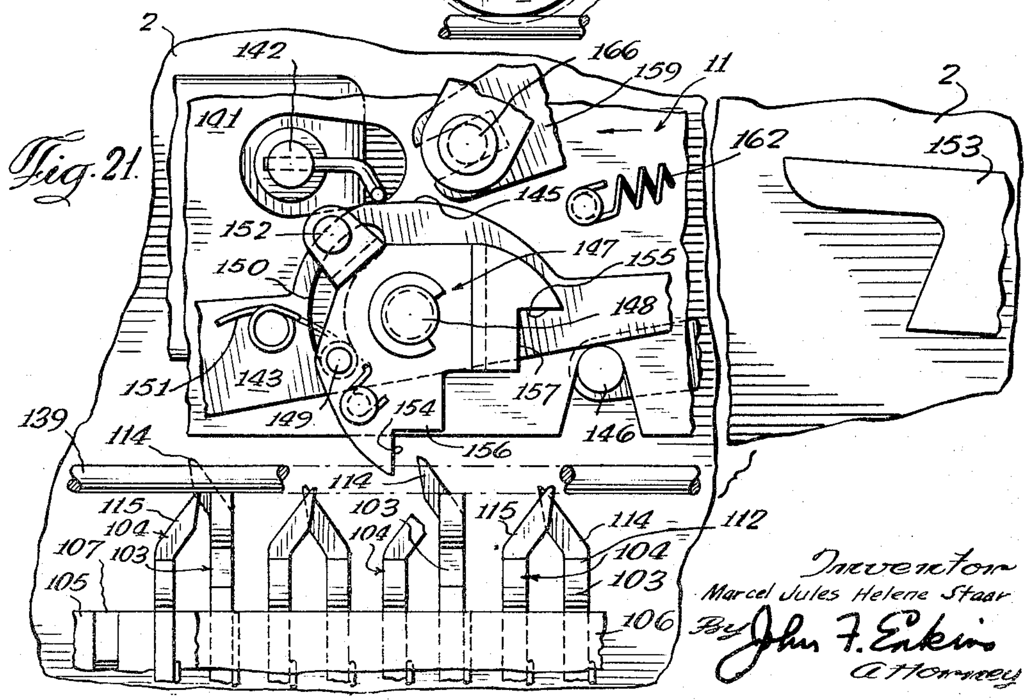
Inventor
Marcel Jules Helene Staar
By John F. Eakins
Attorney July 26, 1960 M. J. H. STAAR 2,946,594

PHONOGRAPHS

Filed Feb. 9, 1954 13 Sheets-Sheet 13

Inventor
Marcel Jules Helene Staar
By John F. Eikins
attorney

United States Patent Office 2,946,594
Patented July 26, 1960

2,946,594

PHONOGRAPHS

Marcel Jules Helene Staar, Ixelles, Belgium, assignor, by mesne assignments, to Seeburg Corporation, a corporation of Pennsylvania Filed Feb. 9, 1954, Ser. No. 409,208

Claims priority, application Belgium Feb. 12, 1953

24 Claims. (Cl. 274—10)

This invention relates to automatic phonographs and particularly to selective automatic phonographs which are arranged to play either or both sides of a plurality of records normally stored in a magazine.

The phonograph comprises essentially a magazine in which records are stored in spaced relation and a playing unit which is arranged to play either side of any record in the magazine. The playing unit and the magazine are arranged for relative movement so that the playing unit may be brought into alignment with any desired record in the magazine. In the embodiment of the invention shown the magazine is stationary and the playing unit is movable. The playing unit is mounted on a carriage which is driven in longitudinal direction along the magazine. The playing unit is mounted on the carriage for rotation on an axis substantially parallel to the plane of the records in the magazine and means are provided for rotating it through approximately 180°. Thus the playing unit has two positions on the carriage. When it is in one position it is adapted to play the left side of a record supplied to it from the magazine, and when it is in the other position it is adapted to play the right side of a record supplied to it from the magazine.

In the preferred embodiment of the invention the records in the magazine and the record on the playing unit are arranged vertically. Means are provided for arresting the carriage in selected positions corresponding to selected recordings. One such means is effective for controlling the playing of one side of a record and another such means is effective for controlling the other side of the record.

The general operation is that records are selected by actuating the corresponding selecting means. The mechanism is put into operation and the carriage starts to move backwards and forwards longitudinally of the magazine. When a selected record is in alignment with a selected record the carriage stops and the record is transferred to the playing unit. The record is now played and at the end of the playing the record is returned to the magazine. If further recordings have been selected the carriage resumes its traverse until all the selected recordings have been played. Means are preferably provided for discharging the selecting means back to normal position.

In the embodiment of the invention illustrated the rotary movement of the playing unit upon its carriage through approximately 180° is effected at the extreme ends of the travel of the carriage. The selecting means are in this case so arranged that the selecting means corresponding to the lefthand sides of records are effective only during the travel of the carriage in one direction and vice versa.

The invention will readily be understood from the following description of a preferred embodiment thereof taken in conjunction with the accompanying drawings, in which:

Figure 1 is a perspective view of the upper part of a phonograph embodying my invention, parts being broken away for better illustration;

Fig. 2 is a transverse sectional elevation of the mechanism, the section being taken on the line 2—2 of Fig. 3;

Fig. 3 is an inverted plan view of the mechanism;

Figs. 4 and 5 are perspective views of the playing unit;

Fig. 6 is a fragmentary transverse section showing the playing unit and associated parts, the view being regarded in the same direction as Fig. 2, the section being taken irregularly;

Fig. 7 is a skeleton view of parts of the playing unit showing their interrelation;

Fig. 8 is a plan view of the playing unit, some of the parts thereof being omitted and the other parts being shown in record playing relation;

Fig. 9 is a sectional view through the turntable member and showing a record about to be secured thereto;

Figs. 10, 11 and 12 are similar fragmentary views showing successive stages in the securement of the record to the turntable member;

Fig. 13 is a fragmentary elevational view showing the trip switch on the playing unit and associated parts;

Fig. 14 is a fragmentary perspective view illustrating the mechanism which actuates the selecting lever;

Fig. 17 is a fragmentary sectional elevation, the section being taken on the line 17—17 of Fig. 16;

Fig. 18 is a fragmentary inverted plan view similar to part of Fig. 16 with the selection mechanism adapted for selecting recordings on the other sides of the records;

Figs. 19 and 20 are fragmentary perspective views of the underside of the machine illustrating the manner in which the selector elements are actuated and the manner in which they cooperate with the carriage;

Fig. 21 is a fragmentary inverted plan view on an enlarged scale showing the manner in which the selector detents of the carriage cooperate with the selector members;

Fig. 23 is a similar fragmentary view showing the condition of the mechanism during the playing of a record and arranged for the drive of the record handling mechanism to return the record to the magazine;

Fig. 24 is an inverted elevational view showing the means for accurately positioning the carriage in alignment with a record;

Fig. 25 is a fragmentary plan view showing the mechanism for unlatching the solenoid armature to effect resumption of travel of the player unit, and Fig. 26 is a wiring diagram.

Figures 15, 16:
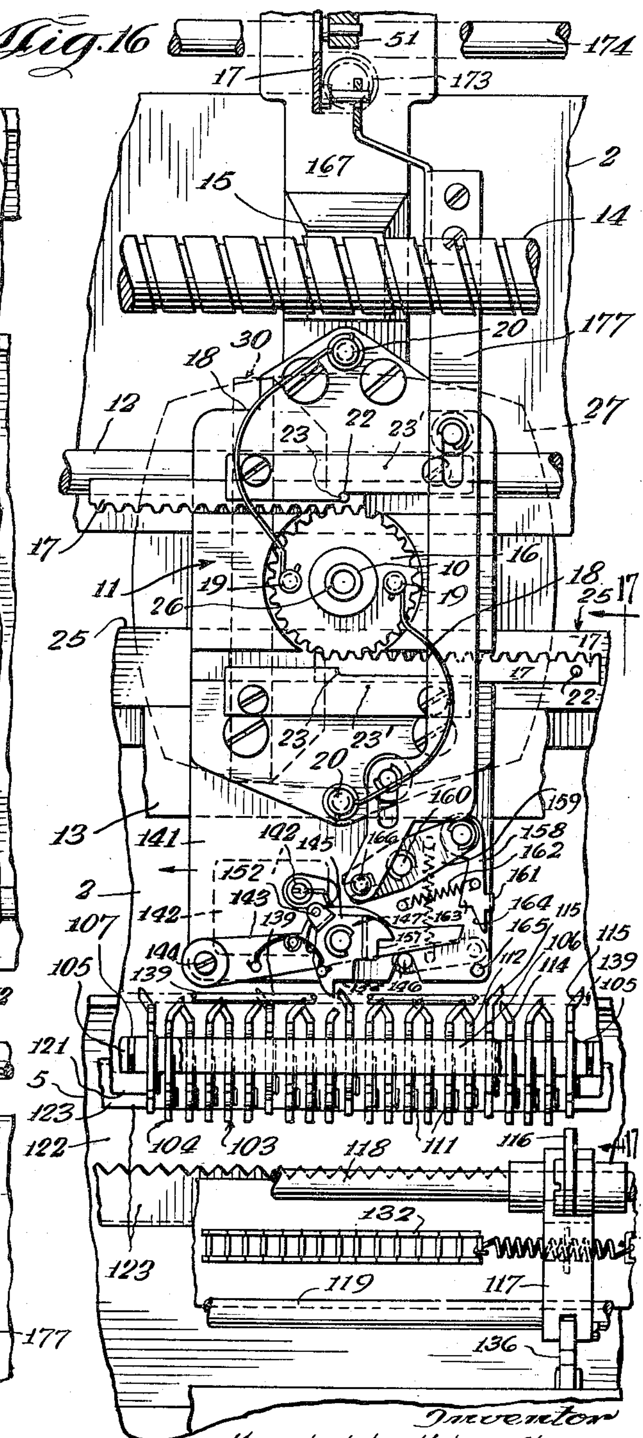
Fig. 15 is a fragmentary inverted plan view showing the mechanism supported by the carriage for effecting the moving out and return of a record from and to the magazine.
Fig. 16 is a similar view showing the main portion of the carriage and also its forward extension and the elements which cooperate to arrest the carriage at selected positions.

Referring to the drawings, and particularly Fig. 1, the phonograph comprises a cabinet 1, a base or board 2 on which the mechanism is mounted, a magazine 3 and a playing unit 4. On the front of the cabinet is provided a program 5 which will hereinafter be more fully described. A transparent dome 6 is provided to enclose the magazine, the playing unit and other elements. On the front of the cabinet is provided a rotary control member 7 which surrounds a selecting button 8. The lower part of the cabinet may be configured in ornamental fashion and it is provided with a screened opening 9, behind which the speaker is located. The player unit 4 is mounted by a pivot 10 on a carriage 11 (Fig. 1) mounted on the underside of the base 2. The carriage is slidably carried on a longitudinal rod 12 and is provided with a roller 12' which rides on a bar 13 rigidly mounted on the underside of the base. A longitudinal screw 14, mounted on bearings on the underside of the base engages a nut formation 15 on the carriage 11. It will readily be seen that when the screw 14 is rotated in one direction the carriage 11 is moved in one direction along the magazine and when the direction of the screw is reversed the carriage moves in the opposite direction. The pivot 10 extends through a longitudinal slot 25 in the base 2.

The pivot 10 which is rigid with the base of the playing unit 4 is rigidly secured to a pinion 16 which is nested in a recess on the underside of the carriage 11. Two racks 17 mounted in longitudinal slots on the underside of the carriage 11 mesh with the pinion 16. Two arcuate over-center springs 18 are connected to diametrically opposite pins 19 of the pinion 16 and to diametrically opposite pins 20 on the carriage 11. Two adjustable pins 21 mounted at each end of the base 2 are arranged to be engaged by one of the racks 17. It will be understood that when the carriage is moving to the left as viewed in Fig. 3 the upper or rear rack 17 engages the lefthand pin 21 with the result that the pinion 16 is rotated in clockwise direction as viewed from below thus rotating the playing unit through approximately 180°. This rotation is completed by the springs 18 after they pass dead center. The final playing position of the player unit 4 is determined by engagement of one of the contacts 22 on the racks 17 with stationary contacts 23 on the carriage 11. The stops 23 are suitably provided as shoulders on plates 23' which are secured to the carriage 11, underlying the racks 17 and holding them in their positions. It will readily be seen from Fig. 3 that the springs 18 tending to straighten hold the appropriate contact 22 in engagement with the appropriate contact 23 in both playing positions of the player unit 4. Two pins 24 shorter than the pins 21 are arranged to engage the lower or forward rack 17 of Fig. 3. When one of the pins 21 actuates the upper rack 17 the player unit is rotated thereby through somewhat more than 90° bringing the springs 18 past dead center. The springs 18 then tend to rotate the player unit through the remainder of the 180°. The adjacent pin 24 is arranged to engage the forward rack 17 before the player unit has rotated through the full 180°. The springs 18 complete this rotation when the reversed movement of the carriage 11 carries the forward rack 17 away from the associated pin 24. Thus each half revolution of the player unit 4 is effected at each end of its travel without excessive shock or snap.

The pivot 10 projects upwardly through the longitudinal slot 25 in the base 2 and is rigidly secured to the playing unit 4 which is located above the base. The pickup lead, switch leads and power leads may extend downwardly through a bore 26 in the pivot member 10.

The player unit 4 (Fig. 4) comprises a base 27 which carries an upstanding wall 28. The wall 28 carries a bearing 29 for a turntable element 30 which is thereby mounted on a horizontal axis. The wall 28 supports a motor 31 the shaft 32 of which projects through the wall 28 and engages the rim of a relatively large rubber wheel 33. The wheel 33 is rotatably mounted on a link **33*a* (Fig. 2) which is secured to a wall 28 by a slot and pin connection. A spring 33*b* secured to the link 33*a* and the wall 28 biases the wheel 33 and a smaller rubber wheel 34, integral with the wheel 33, into engagement with the shaft 32 and the rim of the turntable member 30**. The turntable member is thereby driven in appropriate direction for the playing of records.

Below the bearing 29 the wall 28 carries a horizontal shelf 35 to which is secured a swinging member 36 arranged to swing freely on a vertical axis (Figs. 4 and 5). A pair of stops 37 carried by the shelf 35 establish extreme positions for the member 36 and an over-center spring 38 connected to the member 36 and the shelf 35 serves to bias the member 36 into one or other of its extreme positions. The extremities of the member 36 are bent upwardly and on these ends are pivotally mounted a pair of dogs 39 and 40. These dogs are pivotally mounted on said ends so that they depend downwardly by gravity. Suitable stops 41 may be mounted on the ends to limit the outward movement of the dogs. The dogs are substantially rectangular in shape, their lower horizontal portions 42 and 43 projecting towards the rear face of the turntable element 30. This rear face is provided with an annular recess 44 and one or other of the elements 42 or 43 is located within this recess depending upon the position of the swinging member 36. Radially inward from the recess 44 the turntable element is provided with a cam formation 45 which increases in height in the clockwise direction, that is, in the playing direction of rotation of the turntable member. Consequently if the element 43 is in the recess 44 and it is swung radially inwardly it will engage the cam 45 and the member 36 will be swung in the clockwise direction as viewed from above. On the other hand if the projection 42 is located in the recess 44 and it is moved radially inwardly with respect to the turntable member, it will be brought into engagement with the cam 45 with the result that the rocking member 36 will be snapped in the counterclockwise direction as viewed from above into its other extreme position. The inner edge of the cam 45 is provided with a lip 45' so that the projections 42 and 43 are held in engagement with the cam 45 for complete actuation thereby.

A bell crank lever 46 is pivotally mounted on a horizontal axis on the wall 28. Its upwardly directed arm carries a spring wire 47 which projects upwardly sufficiently to engage the element 42. Its lower generally horizontal arm carries an outwardly directed horizontal pin 48 which extends beyond the playing position of the record. A spring 49 maintains the pin 48 in a relatively elevated position, holding the spring wire 47 away from the member 42 and the upwardly directed arm of the bell crank lever 46 against a stop 50. As will hereinafter be described, a record transfer element 51 moves downwardly as a record is being supplied to the turntable member. During this operation the transfer element 51 depresses the pin 48 and swings the spring wire 47 into engagement with the projection 42 bringing it into alignment with the cam 45. This cam consequently throws the rocking member 36 in a counterclockwise direction as viewed from above.

As shown in Figs. 2 and 4 the wire 47 is bowed or arched away from the axis of the turntable. When this wire moves inwardly so as to engage the projection 42, the direction of movement is such that the wire tends to elongate so that proper engagement of the projection 42 with the cam 45 is insured. On the other hand when the wire 47 is on the inner side of the projection 42 and the member 51 rises away from the pin 48, the spring 49 forces the wire 47 against the inner side of the projection 42. This engagement tends to shorten the effective length of the spring 47 so that the spring may escape past the projection 42 to the outer side thereof.

The player arm 52 is mounted on a T-shaped member 53 (Figs. 5, 6 and 7). The central leg of this member is pivotally mounted in a structure 54 carried by the base 27 for free rotation so as to enable the stylus 55 to translate over the record. The other part of the T-shaped member 53 provides trunnions upon which the player arm 52 is free to rotate so as to enable the player arm to move towards and away from the record. An opening 56 in the player arm accommodates the central leg of the T-shaped member 53 and is sufficiently large so that the player arm can move freely about its pivot towards and away from the record. This central leg of the member 53 is mounted in the horizontal direction and the player arm 52 projects upwardly therefrom, the stylus 55 being directed towards the record position. A light spring 57 mounted on the member 53 biases the player arm towards record playing position. The player arm is moved out of contact with the record by an arm 58 and it is moved outwardly to initial playing position by an arm 59. The arms 58 and 59 are substantially horizontal and are located substantially at right angles to each other. The arm 58 is substantially parallel to the pivotal axis of the player arm on the member 53 and is arranged to engage the "inside" of the player arm, that is the side next the record, and the arm 59 is located so as to engage that side of the player arm which is nearer the center of the record. The arms 58 and 59 are carried by one arm 60 of a U-shaped member 61. The other arm 62 of the member 61 is directed upwardly and carries a spring extension 63 which is arranged to cooperate with the projection 43. The intermediate portion of the U-shaped member 61 is pivotally mounted on a bearing 64 carried by the base 27 so as to provide a horizontal axis for the U-shaped member. This member is biased to the left as viewed in Fig. 13 by a spring 65 so that the arm 58 is moved clear of the player arm 52 during the playing of a record.

The U-shaped member 61 is arranged to be actuated towards the player arm by a roller 66 on the lower end of a lever 67 which is pivotally mounted at an intermediate point 68 on a bracket 69 carried by the wall 28. The roller 66 is arranged to engage the leg 62 adjacent the pivotal axis of the U-shaped member 61. The upper end of the lever 67 carries an abutment 70 which is located on the axis of the turntable member 30 and is arranged to be engaged by the end of shaft 84 beyond a double worm 71 carried thereon. As will hereinafter appear the shaft 84 is movable axially towards and away from the turntable member. When it moves away from the turntable member the lever 67 is swung so that the roller 66 moves the U-shaped member 61 towards the player arm 52. During the first part of this movement the arm 58 engages the "underside" of the player arm, that is the side directed towards the record, and lifts the stylus away from the record. Continued movement of the U-shaped member 61 brings its arm 60 into engagement with a cam surface 72 so arranged that the continued displacement of the U-shaped member causes the U-shaped member to move outwardly so that the arm 59 moves the player arm out to initial playing position. When the shaft 84 is again actuated towards the turntable member 30 the U-shaped member 61 moves under the influence of the spring 65 to withdraw the arm 58 away from the player arm thus allowing the stylus to engage the record in initial playing position. It is to be noted that a spring 73 causes the abutment 70 to follow the shaft 84 to remove the roller 66 out of contact with the U-shaped member 61. This leaves the U-shaped member free except for the engagement of the arm 59 with the side of the player arm and the slight frictional effect of the spring 65. Consequently during the playing of a record the spring wire 63 is carried towards the projection 43 and at the completion of the playing of the record the spring 63 displaces the projection 43 into the path of the cam 45 with the result that the rocking member 36 is snapped in the clockwise direction as viewed from above.

As will hereinafter be more fully described the effect of moving the shaft 84 towards the turntable member 30 is to secure a record to be played to the turntable member and the effect of moving the shaft 84 away from the turntable member 30 is to release the played record. The shaft 84 is keyed to the turntable member 30 so as to rotate therewith. The rocking member 36 is provided with two upstanding horns 74 and 75 arranged to cooperate with the right and lefthand threads respectively of the double worm 71 rigidly carried by the shaft 84. The worm member 71 is "in," that is nearer the turntable member 30 when a record is being played. At the end of the playing of a record the rocking member 36 is snapped in the clockwise direction as viewed from above by the cooperation of the member 43 with the cam 45. This brings the horn 74 into engagement with the worm 71 and it enters the righthand thread formations thereon so that the double worm member 71 is cammed outwardly, that is away from the turntable member 30. As will hereinafter more fully appear the result of the movement of the double worm 71 outwardly is the release of the record which is returned to the magazine. When another record is moved outwardly the pin 48 is depressed and the member 42 is brought into engagement with the cam 45. The rocking member 36 is thereby snapped in the counterclockwise direction bringing the other horn 75 into the lefthand thread path of the double worm member 71 adjacent its end which is nearer the turntable member 30. Consequently the worm 71 is moved towards the turntable member 30. The final movements of the double worm member 71 have a slight snap action, provided by springs 94, which carries the worm slightly clear of the horn 74 or 75 which has just actuated it. This leaves the worm 71 clear of both horns 74 or 75 and leaves it in position to be properly engaged by the horn 75 or 74 respectively on the next swinging movement of the rocking member 36.

An arm 76 is pivotally mounted near the lower end of the lever 67 and is biased downwardly by means of a spring 77 against a stop 78 carried by a bracket 79. The bracket 79 is carried by the base 27 and it provides a pivotal support for a block 80, suitably of insulating material, the upper end of which is directed towards the arm 76. The block 80 rests upon one arm of a switch 81 which is normally open. A stop 82 carried by the bracket 79 limits the movement of the block 80 in counterclockwise direction. A detent 83 on the arm 76 is directed downwardly so as to engage the upper end of the block 80. During playing of a record the detent 83 is beyond the upper end of the block 80. At the end of the playing of a record the double worm 71 moves away from the turntable member 30, swinging the lever 67 so as to elevate the player arm 52 away from the record and move it to initial playing position, and to move the detent 83 so as to swing the block 80 in clockwise direction so as to close the switch 81. The manner in which the closing of this switch 81 initiates the return of the played record to the magazine will hereinafter be described. It is to be noted that the detent 83 clears the block 80 allowing the switch 81 to close. When a new record is applied to the turntable the arm 76 is swung in the opposite direction without affecting the switch 81 because of the engagement of the block 80 with the stop 82. The detent 83 simply moves over the end of the block 80.

The double worm 71 is rigidly secured to a shaft 84 which is slidably mounted in the hub 85 of the turntable member 30. A set screw 86 extends into a slot 87 in the shaft 84 to cause the shaft to rotate with the turntable member 30 (Fig. 9). At its outer end the shaft 84 carries a cap 88 which has a diameter slightly less than the opening 89 of a record to be played. This cap is provided with rounded corners to facilitate movement of the cap into the central opening of a record. The cap 88 is provided with a plurality of radial slots 90 each of which accommodates a dog 91. Each dog 91 is pivoted at 92 on suitable formations on the cap 88. The shaft 84 carries a central disc 93. An over-center spring 94 is connected to each dog 91 and to the disc 93. Each dog is provided with a record engaging arcuate portion 95 and an actuating projection 96. When the shaft 84 is moved inwardly by the double worm 71 the cap 88 and the dogs 91 are withdrawn into a center opening 97 on the outer face of the turntable member 30 so that a record is released from the turntable member. When the shaft 84 is moved outwardly by the double worm 71 the cap 88 moves outwardly through the central opening 89 of a record located in alignment with the turntable member. The arcuate portions 95 of the dogs 91 are also carried through the central opening of the record. Near the final stage of the outward movement of the shaft 84 the actuating projections 96 of the dogs engage an inwardly directed lip 98 of the recess 97 so that the dogs are swung about their pivots causing the record engaging portions 95 to engage the outer surface of the record at several points around its central opening. The over-center springs 94 maintain pressure on the dogs 91 so as to maintain them in gripping relation as long as the cap 88 is in its outward position. When the cap 88 is moved inwardly again the dogs rotate in the opposite direction to free the record and the dogs and cap 88 are withdrawn into the recess 97 inwardly of the record engaging surface 99 of the turntable member 30.

A standard 100 mounted on the base 27 carries at its upper end an arcuate member 101 which serves as a fence or abutment for the record which is being secured to the turntable member 30 or being released therefrom. The member 101 provides two ends 102 which are located substantially in a horizontal plane through the axis of the turntable member 30. The ends 102 of the horizontal member are spaced sufficiently from the turntable member 30 to permit a record to move freely between the ends 102 and the record engaging face 99 of the turntable member.

An individual selector member 103 or 104 is provided for each side of each record in the magazine (Figs. 16 to 21). The selector members 103 correspond to one side of the records and the selector members 104 correspond to the other side of the records. These selector members are mounted upon two longitudinal bars 105 and 106 supported on the underside of the base 2 and since there are two selector members for each record their spacing is half the spacing of the records in the magazine. This spacing is maintained by the entry of upper and lower portions of the selector members 103 and 104 into transverse slots 107 and 108 in the bars 105 and 106. Within each slot 107 the bar 105 is provided with a pivot formation 109 which extends into a V-shaped recess 110 at the upper end of each selector member. Each selector member is provided with two depending legs 111 and 112 which are located one on each side of the bar 106 so as to permit limited movement of the selector member from normal to selected position and vice versa. The upper side of the bar 106 is in the shape of an inverted V. Each selector member is provided with a spring 113 which engages this V-shaped formation so as to hold the selector member in normal or selected positions. The selector members 103 are provided on the rear side with projections 114 and the selector members 104 are similarly provided with projections 115. The projections 114 are located in a higher plane than the projections 115. The projections 114 and 115 appertaining to one record are displaced horizontally so as to bring their extremities substantially into the same vertical plane.

The selector members 103 and 104 are arranged to be actuated from normal into selecting position by means of a lever 116 which is pivotably mounted on a block 117 (Fig. 19). This block is slidably mounted upon longitudinal rods 118 and 119 so that the lever 116 may be brought into register with any selector member 103 or 104. A spring 120 biases the lever 116 forwardly away from the selector members 103 and 104. The upper end of the lever 116 projects through a slot 121 in the base 2 and through a registering slot 122 in a strip 123 which is mounted on the upper side of the base 2 (Figs. 1, 9 and 14). The strip 123 is adapted for a slight rearward and forward movement being provided at each end with a slot 124 which receives a bolt 125 secured through the slot to the base 2. Adjacent at each end the strip 123 is provided with openings 126 within which are received the ends of two arms 127 which extend radially from a longitudinal bar or shaft 128. The bar 128 is rotatably mounted on brackets 129 carried by the base 2. It will readily be understood that when the bar 128 is rotated in one direction the strip 123 moves rearwardly and when it is moved in the opposite direction the strip moves forwardly. At one end the shaft 128 carries an arm 130 which is connected to the armature of a solenoid 131. When the solenoid 131 is energized the strip 123 is moved rearwardly and a spring on the armature effects its forward return when the solenoid 131 is no longer energized. The forward edge of the slot 122 is provided with V-shaped recesses having the same spacing as the selector members to cooperate with the V-shaped recesses. Consequently if the lever 116 is slightly out of alignment with a selector member 103 or 104 its engagement with one of the V-shaped recesses will correct the alignment to insure actuation of the corresponding selector member when the strip 123 is moved rearwardly. The block 117 is connected to a chain 132 which passes over idler sprockets 133 at each side of the machine and over a sprocket 134 mounted on the hollow sleeve of the manual control 7. It will thus be seen that by rotating the control member 7 the lever 116 can be brought into selecting relation with any of the selector members 103 or 104. The button 8 is biased outwardly. When pressed inwardly it effects the closing of a switch 135 to energize the solenoid 131 thus moving the selecting member 103 or 104 in alignment with the lever 116 into selected position.

The program panel 5, which is mounted on the front of the machine, carries the titles of the recordings provided by both sides of the records. This program is provided with small windows 137 of transparent or translucent material, preferably located in a plurality of oblique series. The arrangement is such that one of the windows 137 is provided in each title. The longitudinal spacing of the windows 137 is the same as the spacing of the selector members 103 and 104. A strip of colored plastic 136 is carried by the block 117 so as to extend from top to bottom of the program panel 5, behind which it is located. This strip is illuminated by a fluorescent lamp 138 which extends longitudinally up and behind the program panel 5. To select any recording the control member 7 is rotated until the corresponding window 137 is illuminated with light of the color provided by the plastic strip 136. This brings the lever 116 into alignment with the corresponding selector member 103 or 104. The button 8 is now pressed with the result that the lever 116 moves the corresponding selector member into selecting position. A bail 139 is pivotally mounted so that its major length is adjacent the inner sides of the selector members 103 and 104. When one or more of the selector members 103 or 104 are in selecting position the bail 139 is rotated from its normal position closing a switch 140 (Figs. 3 and 20). The bail 139 is biased by the switch towards the selector members 103 and 104 so that, when all the selector members 103 and 104 are returned to their normal positions, the switch 140 opens.

The carriage 11 is provided with a forward extension 141 which carries a normally open switch 142. A lever 143 is pivoted to the extension 141 at 144 and is provided with a portion 145 which is adapted to engage the arm of the switch 142 and close this switch when the lever 143 is moved rearwardly. The lever 143 has a normal position between the arm of the switch 142 and a pin 146 which is biased rearwardly. A swinging member 147 is pivotally mounted at 148 on the lever 143. This swinging member is provided with a pin 149 which extends into a slot 150 in the lever 143 so as to limit the movement of the swinging member 147 in both directions. The member 147 is biased into either extreme position by means of an over-center spring 151 connected to the lever 143 and the swinging member 147. The swinging member 147 is provided with a pin 152 which is adapted to engage one or other of two abutments 153 at the end of the travel of the carriage in either direction. It will thus be seen that member 147 is swung to one extreme position at the end of the travel to the right and to the other extreme position at the end of the travel to the left. The swinging member 147 is provided with two detents 154 and 155 which are arranged to cooperate with the projections 114 and 115 of the selector members 103 and 104 respectively. For this purpose the detent 155 is located in a lower horizontal plane than is the detent 154. In one extreme position of the rocking member 147 the detent 155 is located so as to cooperate with the projections 115. Rotation of the rocking member 147 into its other extreme position withdraws the detent 155 from the projections 115 and brings the other detent 154 into position to cooperate with the projection 114 of any selector 103 which may be in selecting position. When the detent 155 or the detent 154 encounters a projection 115 or 114, as the case may be, the lever 143 is displaced rearwardly closing the switch 142. As will hereinafter be described, the closing of the switch 142 terminates the travel of the carriage 11. The final movement of the carriage leaves the arresting projection 114 or 115 in alignment with a flat surface 156 or 157 adjacent the arresting detent 154 or 155 respectively (Figs. 16, 18 and 21). Consequently when the lever 143 is moved forwardly, in manner hereinafter described, the arresting selecting member 103 or 104 is returned to its normal non-selecting position. The forward actuation of the lever 143 is effected by a dog 158. This dog is pivotally connected to a lever 159 which is pivotally mounted at 160 on the extension 141. The dog 158 is provided with a projection 161 which bears against the edge of the extension 141, being held thereto by a spring 162. When the lever 159 is swung in clockwise direction as viewed from below the dog 158 advances forwardly bringing a detent 163 thereon into engagement with the extremity of the lever 143. Thus this lever is moved forwardly against the force applied thereto by the pin 146 and the arresting selector member 103 or 104 is thereby returned to non-selecting position. At the end of the movement of the lever 159 a cam surface 164 on the dog 158 engages a pin 165 on the extension 141 so that the dog 158 is cammed away from the lever 143. This lever consequently is released and returned to normal position by the bias applied thereto by the pin 146 (Fig. 18). The initial contact between the detent 163 and the extremity of the lever 143 is very slight and the dog 158 may move rearwardly past the end of the lever 143 without causing the closing of the switch 142. The lever 159 is oscillated in one direction or the other by means of a pin 166 which extends into a slot in one end of the lever 159. As will hereinafter be described the pin 166 is connected to the mechanism which effects the movement of the record into playing position and its return to the magazine. It may here be noted that when a record is moved out for playing the dog 158 is moved forwardly to effect the return of the arresting selector member 103 or 104 as the case may be.

The carriage 11 is provided with a rearward extension 167 upon which are pivotally mounted the arms 51 and 168 which project upwardly through longitudinal slots 169 and 170 in the base 2. Their lower ends are connected by a link 171 which is guided for sliding movement in its longitudinal direction by means of a bracket 172 carried by the extension 167. The link 171 carries a roller 173 which engages a bail 174. This bail extends in the longitudinal direction of the machine and is pivotally mounted at each end of the base 2. The link 171 is biased rearwardly by a spring 175 so that the roller 173 forces the bail 174 against a cam 176. As will hereinafter appear the cam 176 is mounted on a stationary axis while the roller 173 moves with the carriage 11. In this way the cam 176 can actuate the arms 51 and 168 in all positions of the carriage.

The lever 168 is arranged to engage the rear side of a record in the magazine and roll it forwardly when the link 171 is permitted to move rearwardly by the cam 176. At the same time the arm 51 swings forwardly and receives the record being moved out by the arm 168. As has been heretofore described the arm 51 moves forwardly and downwardly so as to bring the selected record out with its opening into substantial alignment with the cap 88. The arm 51 is in the form of a channel, preferably closed at its outward end. The arm 51 moves downwardly slightly past horizontal so that the record is positioned vertically slightly below its playing position and slightly forward of its playing position, and in engagement both with the channel 51 and a strip 270 which may be carried on the program member 5. The generally beveled edges of the cap 88 raise the record slightly away from the channel 51 and slightly away from the strip 270 so that the record is free for rotation during playing, at which time it is clamped on the turntable member as has been previously described. The link 171 is connected to a strap 177 which carries the pin 166 previously referred to. The strap 177 is guided by suitable slots and pins so as to move forwardly and rearwardly as the record is being returned or moved out for playing respectively.

The magazine 3 comprises a plurality of spacers 178 best shown in Fig. 2. These spacers are connected along the rear side by a strap 179. An arcuate strip 180 connects the lower portions of the spacers 178 and provides an arcuate seat for the records. Between the spacers 178 the strips 179 and 180 are provided with V-shaped recesses 181 and 182 which serve to center each record in its space. Along the forward edge of the strip 182 is provided a downwardly extending strip 183 which serves as a foot. The portions of the magazine so far described may be fabricated from plastic sheet and it is to be noted that the forward edges of the spacers 178 are beveled as indicated at 184 to facilitate return of each record into its proper space. The end members of the magazine are preferably more substantial than the spacers 178 and they extend downwardly below the strip 180 to provide end feet or supports 185. The magazine is adapted to rest on a slightly elevated platform 186 of the base 2. It is preferably held in position on the base by the upturned ends 187 of a metal plate 188 secured to the platform 186. The end members 187 are arranged frictionally to engage the end members of the magazine and accurate positioning of the magazine is insured by the engagement of the end members 187 with the front wall 183 and strips 189 secured to the end walls. It is to be noted that the program member 5 is removable and replaceable like the magazine. It will thus be seen that it is a very simple matter to replace the magazine by another magazine and to replace the program member 5 by a program member appropriate to the new magazine. It will be noted with reference to Fig. 2 that the spacers 178 are provided with cutouts 190 so that the arm 168 may move freely into the magazine to eject a selected record therefrom.

As also shown in Fig. 2 the record transporting member 51 operates between two vertical posts 191 which are carried by the extension 167 of the carriage 11. As will readily be seen from this figure the posts 191 clear the records in the magazine and they insure proper transport of the record from and to the magazine.

Figure 22:
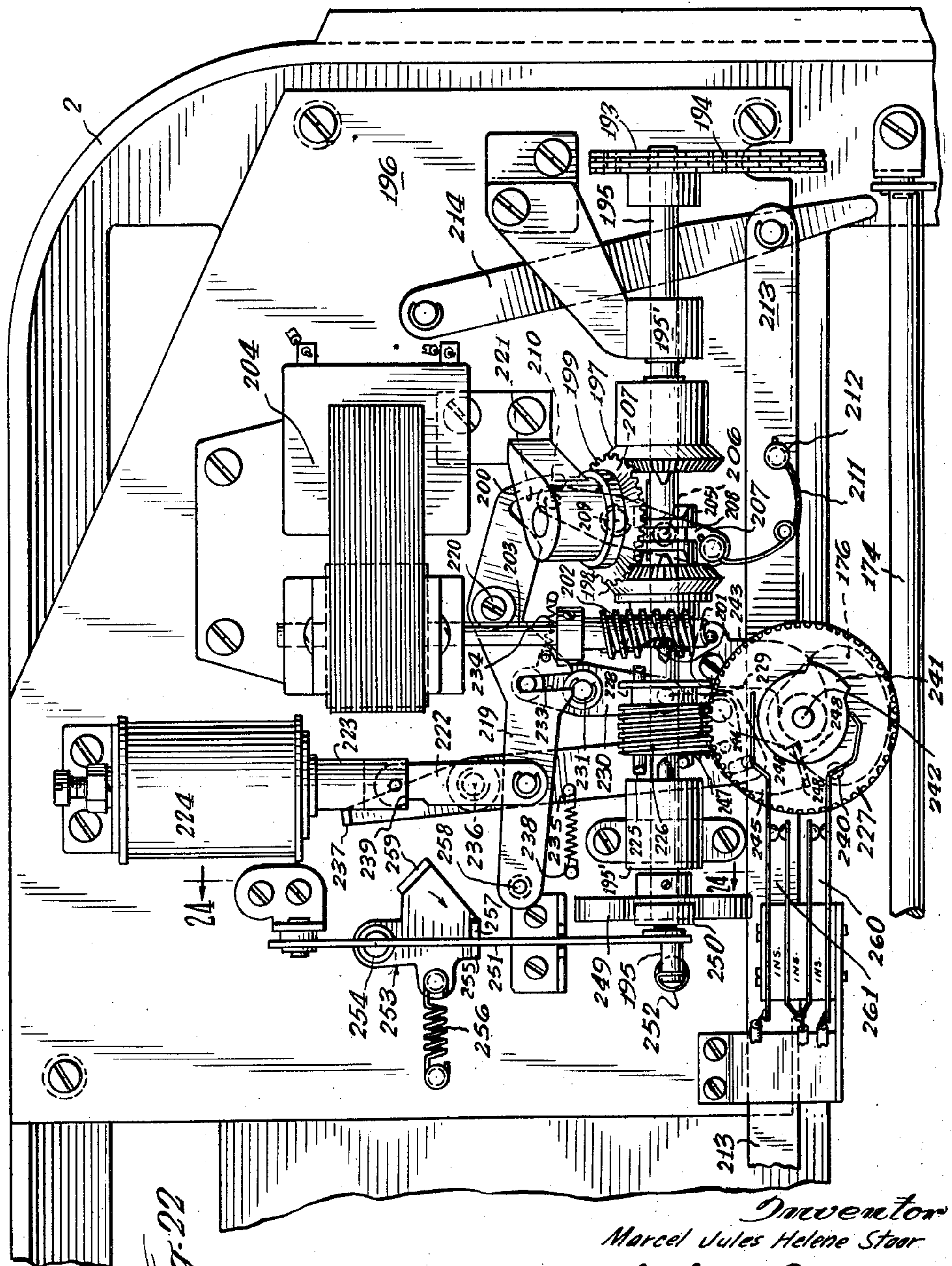
Fig. 22 is an inverted plan view showing the mechanism which drives the player unit and effects the movement of the record to and from the playing unit, the mechanism being shown in condition for traversing the player unit.

The screw 14 carries a sprocket wheel 192 which is driven from a sprocket wheel 193 by a chain 194. The sprocket wheel 193 is rigidly mounted on a shaft 195 which is rotatably mounted in bearings 195' which are supported on a sub-base plate 196 mounted below the base 2 and in spaced relation thereto (Figs. 22 and 23). Suitable means are provided to hold the shaft 195 against axial displacement. Upon the shaft 195 are mounted two bevel gears 197 and 198. These bevel gears are freely rotatable on the shaft 195 and suitable means are provided for maintaining them against axial displacement on the shaft. The two bevel gears 197 and 198 mesh with an idler bevel gear 199 which is rotatably mounted in a bracket 200 carried by the plate 196. Integral with the bevel gear 198 is a pinion 201 which meshes with a worm 202. The worm 202 is carried by a shaft 203 of a motor 204 which is mounted on the plate 196. Between the bevel gears 197 and 198 a clutch member 205 is slidably mounted on the shaft 195 and is keyed thereto. The bevel gears 197 and 198 and the clutch member 205 carry clutch projections adapted to engage each other. It will readily be understood that when the clutch member 205 is in one extreme position and the motor 204 is operating then the carriage 11 will be driven in one direction. When the clutch member 205 is moved to its other extreme position then the carriage 11 is driven in the opposite direction. It will also be understood that when the clutch member 205 is moved to an intermediate position the drive of the carriage 11 is terminated. The clutch member 205 is moved into any of its three positions by means of a pin 206 carried on a lever 207 and extending into a circumferential slot 208 in the clutch member 205. The lever 207 is pivotally mounted on the plate 196 at 209. Its rear end carries a downwardly directed pin 210 and its forward end is connected by means of an over-center spring 211 with a pin 212 carried by a link 213. The link 213 extends longitudinally of the machine and at its ends it is pivotally connected to two levers 214, one of which is pivotally mounted on the plate 196, the other being pivotally mounted on a small plate 215 carried from the base 2 at the same level as the plate 196. The forward edge of the plate 215 is bent downwardly to form a flange 216. This flange is provided with a longitudinal slot 217 which receives and supports the forward end of the adjacent lever 214. The rearward extension 167 of the carriage 11 carries two pins 218 which are arranged to engage the forward ends of the levers 114 at the end of the travel of the carriage 11. The arrangement is such that the link 213 is moved longitudinally and displacing the spring 211 past dead center. Thus when the link 213 is to the right the clutch 205 is biased to the left and vice versa.

A lever 219 pivoted to the plate 196 at 220 is provided with a V-formation 221 which is directed towards the pin 210 on the lever 207. When the lever 219 is in the position shown in Fig. 22 the spring 211 forces the clutch 205 into engagement with the bevel gear 197 or 198, depending upon the position of the link 213. When the lever 219 is swung into the position shown in Fig. 23 the pin 210 is engaged by the V-shaped formation and is carried into a central position thus moving the clutch 205 to an intermediate disengaged position. The lever 219 is connected by a link 222 to the armature 223 of a solenoid 224. When the solenoid 224 is energized the lever 219 is swung in the clockwise direction as viewed from below and the clutch 205 is moved to disengaged position.

A second clutch member 225 is mounted on the shaft 195 between a bearing 195′ and the pinion 201. The clutch member 225 is free to slide and rotate on the shaft 195. The clutch member 225 comprises a worm 226 which meshes with a pinion 227, and it is also provided with a circumferential slot 228 which receives an actuating pin 229. The actuating pin is carried by a lever 230 which is pivotally mounted at 231 on the plate 196. The lever 230 carries a pin which is located within a slot 233 of the lever 219. It will readily be seen that when the solenoid 224 is energized and the lever 219 is swung into its position in Fig. 23 the clutch member 225 is moved to the right as viewed in that figure bringing clutch projections on the member 225 and the pinion 201 into an operative engagement. On the other hand when the lever 219 moves again to its position in Fig. 22 the clutch member 225 moves to the left disengaging the pinion 201. It is to be noted that the member 228 and the adjacent bearing 195′ are provided with projections which are in the same path and prevent any substantial drift or rotation of the pinion 227 when the clutch 225 is disengaged. Thus, when the clutch member 225 is engaged the clutch member 205 has a central inoperative position and when the clutch 225 is disengaged the clutch member 205 is in an engaged position depending upon the position of the link 213. The lever 219 and associated elements are biased into their position of Fig. 22 by means of a spring 234 connected to the lever 230 and to the plate 196. A latch 235 is pivotally mounted on the plate 196 at 236. The rear end of the latch 235 is turned downwardly to provide a detent 237 which is biased towards the armature 223 by a spring 238. When the solenoid 224 is energized and the armature 223 is moved rearwardly into the solenoid the detent 237 engages a shoulder 239 on the armature 223 so as to hold it in retracted position as shown in Fig. 23.

The cam 176 previously referred to is mounted on the upper side of the pinion 227. Also mounted on the upper side of the pinion 227 is a pin 240 which is arranged to unlatch the latch 235. On its underside the pinion 227 carries a switch cam 241. The pinion 227 is rotatably mounted on a shaft 242 which depends from a bracket 243 carried by the plate 196. The end of the latch lever 235 adjacent the pinion 227 has pivoted thereto 244 a dog 245. The dog 245 has a limited movement with respect to the latch 235, that is a pin and slot connection 246, and it is held in one extreme position by a light spring 247 connected to the latch 235 and the dog 245. The dog 245 is provided with a downturned flange 248 which lies in the path of the pin 240. When a record is being returned to the magazine the pin 240 engages the flange 248 and displaces it through the distance permitted by the pin and slot connection 246. Thereupon the pin 240 displaces the latch 235 towards unlatching position. When it is finally unlatched the lever 219 swings in the counterclockwise direction as viewed in Figs. 22 and 23, and the combined clutch and gear member 225 is displaced to the left as viewed in this figure terminating the drive of the pinion 227 and imparting to the pinion 227 a step movement in the counterclockwise direction as viewed in this figure. This movement carries the pin 240 away from the flange 248 and this flange is also retracted from the pin 240 by the spring 247. This occurs at the time that the clutch member 205 engages one or other of the gears 197 or 198 to effect traversing of the playing unit 11. This traversing movement is terminated by the energization of the solenoid 224 and the member 225 is again moved to the right as viewed in Figs. 22 and 23. Owing to the free movement provided for the dog 245 the stepping movement of the pinion 227 in the clockwise direction as viewed in these figures do not bring the pin 240 into engagement with the flange 248.

At one end of the shaft 195 is rigidly mounted a heart-shaped cam 249 which is arranged to be engaged by a roller 250 carried by a lever 251 (Figs. 22 and 24). The lever 251 is strongly biased towards the cam 249 by a strong spring 252 connected to the lever 251 and to the plate 196. The arrangement is such that one revolution of the shaft 195 corresponds to movement of the carriage 11 a distance exactly equal to the spacing of the records provided by the magazine and the cam 249 is positioned so that when the roller 250 engages the depression in the cam 249 then the carriage is properly located opposite one record. Thus when the drive of the shaft 195 is terminated the roller 250 entering the depression of the cam 249 finally aligns the carriage with the record to be played and insures the position of the surface 156 of the rocking member 147 with the arresting projection 114 as shown in Fig. 21 or a similar relation between the surface 157 and an arresting projection 115.

It is undesirable to have the roller 250 cooperating with the cam 249 while the carriage 11 is being moved backwards and forwards looking for a selection. I therefore prefer to provide a latch 253 pivoted on the plate 196 at 254. When the roller 250 is seated in the depression of the cam 249 the lever 251 is engaged by an edge 255 of the latch which is drawn against the lever 251 by a spring 256. When the shaft 195 rotates, lever 251 is raised allowing a step portion 257 of the latch to enter below the lever 251. This occurs when the shaft 195 is being driven by the clutch member 205. This drive is terminated when a selected position is attained by the carriage 11 at which time the solenoid 224 is energized. The lever 219 carries a pin 258 which is adapted to engage a downturned flange 259 on the latch 253 in such manner that the lever 251 is free to move downwardly under the influence of the spring 252 so as to bring the roller 250 into aligning relation with the cam 249.

The switch cam 241 previously referred to is arranged to cooperate with two normally closed switches 260 and 261 (Fig. 22). The switch 260 is arranged to be opened after a record has been returned to the magazine and just before the latch lever 235 unlatches the lever 219 to cause the carriage 11 to be driven. This switch is closed again immediately after the unlatching by the step movement which is then applied to the pinion 227 by the worm 226. The switch 261 is opened when a record is supplied out to the playing unit and it remains open until the pinion 227 is again driven through a small angle. This occurs when the switch 81 is closed at the end of the playing of a recording.

At the end of operation of the machine the switch 261 is closed and the switches 81, 260 and 142 are open. When a record is selected the switch 142 closes thus the turntable motor 31 is put into operation. The switch 261 being closed the motor 204 is put into operation. The previous operation of the machine was effected by opening the switch 260. The resumed operation of the pinion 227 effects the unlatching of the lever 219 thus closing the switch 260, terminating the drive of the pinion 227 and initiating the drive of the screw 14 through the clutch member 205. This drive continues until a selecting position is attained whereupon the solenoid 224 is energized resuming the drive of the pinion 227 and terminating the drive of the carriage 11. The drive of the pinion 227 continues for approximately half a revolution during which time the selected record is moved out for playing. When the record is fully moved out the switch 261 is opened and the motor 204 goes out of operation during the playing of the record both switches 261 and 81 being open. As has been previously noted the switch 142 opens when the last selected record is moved outwardly but the motor 204 is conditioned for operation to return the record to the magazine, the switch 260 being closed. After a record has been played and released from the turntable the switch 81 is closed so that the drive of the motor 204 is resumed, the circuit being completed through switches 260 and 81. The switch 81 remains closed sufficiently allowing for the cam to permit the closing of the switch 261 so that the operation of the pinion 227 continues until the record is returned to the magazine. Thereupon the switch 260 is opened. If there are no other selections on the machine the switch 140 is also open so that both motors 31 and 204 are deenergized.

If a plurality of recordings are selected the machine still will continue to operate to play one recording after the other, the switch 140 remaining closed until the last record is moved out for playing. It will readily be understood that this record is played and the machine is stopped in the same manner as just described.

The operation is as follows. The machine stopped after previous use by the opening of the switch 140 when the last effective selector member 103 or 104 was returned to normal position and the subsequent opening of the switch 260 after the playing of the last recording. With both the switches 140 and 260 open, it is obvious that both motors 31 and 204 are deenergized. To start the machine the control member 7 is turned so as to show colored light through the window 137 associated with the desired title. The button 8 is pushed in and the corresponding selector member 103 or 104 is displaced to selecting position and the switch 140 is closed. Any number of recordings may be selected. As will readily be understood from the wiring diagram (Fig. 26), the turntable motor 31 is put into operation and remains in operation until both switches 140 and 260 become open simultaneously. The closing of the switch 140 starts the motor 204, the switch 261 being closed. The pinion 227 is driven through a small angle to move the latch 235 to unlatched position. The clutch member 225 is given a step movement which closes the switch 260 and disengages it, and the clutch member 205 is caused to engage the gear 197 or 198, depending upon the position of the link 213. If the link 213 is in its position of Fig. 22 the carriage 11 will be driven to the left as viewed from below. Upon the first revolution of the shaft 195 the cam 249 moves the lever 251 away from the plate 196 and it is latched out by the latch 253. Since the carriage 11 is moving to the left as viewed in Fig. 21, the detent 154 is positioned to engage the projections 114 of actuated selector members 103. When such engagement occurs the switch 142 is closed, the solenoid 224 is energized and its armature is latched in. The lever 219 is swung to its position of Fig. 23 causing disengagement of the clutch 205 and engagement of the clutch 225. At the same time the latch 253 is unlatched. The lever 251 released and the roller 250 is pulled into the recess in the cam 249 thus accurately aligning the player unit in correct alignment with the selected record in the magazine and locating the surface 156 in correct position with respect to the arresting projection 114 as shown in Fig. 21.

At this time the player unit 4 is in the relation shown in Fig. 1 so that the left hand side of a record is played. It may however be pointed out that the player unit operates the same way in both its positions, but that in the other position, the right hand side of a record is played.

The pinion 227 is driven approximately half a revolution, that is until the cam thereon opens the switch 261 whereupon the motor 204 stops, the turntable motor 31 continuing to operate because the switch 260 is closed.

During this half revolution the cam 176 moves away from the bail 174 allowing the link 171 to move rearwardly under the influence of the spring 175. This causes the levers 168 and 51 to swing clockwise as viewed in Fig. 2 causing the selected record to be moved out of the magazine 3 between the horns 191 in engagement with the trough 51. Near the end of its movement the trough 51 engages the pin 48 and depresses it. At the end of the movement of the trough 51 the record is supported thereon and in contact with the strip 270.

The operation of the player unit 4 has been described minutely. It is therefore considered to be sufficient to state that the cap 88 is projected to lift the record clear of the trough 51 and strip 270 and clamp it to the turntable member 30 upon which it is reproduced.

At the end of this half revolution of the gear 227, the slide 177 is moved rearwardly and the dog 158 is moved forwardly, swinging the lever 143 forwardly and returning the arresting selector member 103 to its normal position.

As has been stated above the motor 204 stops during the playing of a record. At the end of the playing the switch 81 is closed for a period. The motor 204 goes into operation to drive the gear 227 to return the player record to the magazine. It is to be noted that the switch 81 remains closed until the switch 261 is closed by movement of the switch cam 241. When the record is returned to the magazine the switch 260 is opened and if the switch 140 is open the machine stops. If the switch 140 is closed, owing to the fact that other selections remain to be played, the drive of the gear 227 continues until the latch 235 is unlatched whereupon the drive is transferred to the carriage 11 and the operation is continued until all selected recordings are reproduced.

It is to be noted that at the end of the travel of the carriage 11 in one direction the following events occur:

(1) the link 213 is moved to its other extreme position, biasing the clutch member into engagement with the other of the two pinions 197 or 198; (2) the player unit is rotated on its vertical axis by engagement with one of the racks 17 with a pin 21, and (3) the member 147 is swung by engagement with one of the members 153 from one extreme position to the other.

It will thus be understood that the left hand sides of the records are played during intervals in the movement of the player unit in one direction and that the right hand sides of the records are played during intervals in the movement of the player unit in the other direction, and that when all the recordings selected have been reproduced the machine stops.

Having thus described my invention, I declare that what I claim is:

1. In an automatic phonograph, in combination, a magazine for records, a player unit including a turntable and a player arm, said magazine and player unit being relatively movable to bring any record in the magazine into cooperative relation with the player unit, means for transferring any record in the magazine into its corresponding playing position and means for rotating said player unit bodily, on an axis parallel to the plane of a record in playing position, through substantially half a revolution to bring said unit into two playing positions, in each of which it is adapted to play a corresponding side of the record.

2. In an automatic phonograph, in combination, a magazine for records, a player unit including a turntable and a player arm, said magazine and player unit being relatively movable to bring any record in the magazine into cooperative relation with the player unit, said player unit being arranged to reproduce said record while said record is in a playing position parallel to the records in the magazine, means for transferring any record in the magazine into its corresponding playing position, and means for rotating said player unit, on an axis parallel to the plane of a record in playing position through substantially half a revolution to bring it into two playing positions, in each of which it is adapted to play a corresponding side of the record.

3. In an automatic phonograph, in combination, a magazine supporting records in vertical position, a player unit including a turntable and a player arm adapted to play a record in vertical position, said magazine and player unit being arranged for relative movement to locate the player unit in record receiving position with respect to any record in the magazine, means for transferring a record from the magazine to the player unit and vice versa, and means for rotating the player unit bodily, on an axis parallel to the plane of a record in playing position, through substantially half a revolution into two playing positions in each of which it is adapted to play a corresponding side of a record.

4. In an automatic phonograph, in combination, a magazine for records, a player unit including a turntable and a player arm, said magazine and player unit being relatively movable to bring any record in the magazine into cooperative relation with the player unit, said player unit being arranged to reproduce said record while said record is in a playing position parallel to the records in the magazine, means for transferring any record in the magazine into its corresponding playing position, and means for rotating said player unit through substantially half a revolution, on an axis parallel to the planes of the records in the magazine, to bring it into two playing positions, in each of which it is adapted to play a corresponding side of the record.

5. In an automatic phonograph, in combination, a magazine supporting records in vertical position, a player unit including a turntable and a player arm adapted to play a record in vertical position, said magazine and player unit being arranged for relative movement to locate the player unit in record receiving position with respect to any record in the magazine, means for transferring a record from the magazine to the player unit and vice versa, and means for rotating said player unit bodily, on an axis parallel to the plane of a record in playing position, through substantially half a revolution into two playing positions in each of which it is adapted to play a corresponding side of the record.

6. In an automatic phonograph, in combination, a magazine supporting records in vertical position, a player unit including a turntable and a player arm adapted to play a record in vertical position, said magazine and player unit being arranged for relative movement to locate the player unit in record receiving position with respect to any record in the magazine, means for transferring a record from the magazine to the player unit and vice versa, and means for rotating said player unit bodily, on a vertical axis, through substantially half a revolution into two playing positions in each of which it is adapted to play a corresponding side of the record.

7. In an automatic phonograph, in combination, a stationary magazine for records, a player unit movable past said magazine to bring the player unit into cooperative relation with any record in the magazine, said unit including a turntable and a player arm, means for transferring any record in the magazine into its corresponding playing position, and means for rotating said player unit bodily, on an axis parallel to the plane of the record in playing position, through substantially half a revolution to bring said unit into two playing positions, in each of which it is adapted to play a corresponding side of the record.

8. In an automatic phonograph, in combination, a stationary magazine for records, a player unit including a turntable and a player arm, means for moving said player unit backward and forward along the magazine, means for arresting said player unit in cooperative relation with any record in the magazine, means for transferring any record in the magazine into its corresponding playing position, and means effective at the end of each forward and backward travel for rotating the player unit, on an axis parallel to the plane of a record in playing position through substantially half a revolution whereby it is adapted to play the left hand sides of records when its travel is in one direction and to play the right hand sides of records when its travel is in the opposite direction.

9. In an automatic phonograph, in combination, a magazine for records, a player unit having a rotatable record support for holding a record in playing position, said magazine and player unit being relatively movable to bring any record in the magazine into cooperative relation with the player unit, a player arm, means for supplying a record from said magazine to said record support, the player arm being on a first side of said playing position and the record support being on a second side of said playing position, and means for rotating said player unit bodily, on an axis parallel to the plane of the record in playing position, substantially half a revolution whereby the player arm is located on the second side of said playing position and the record support is located on the first side of said playing position, whereby the phonograph is adapted to play one side and the other side of the record.

10. In an automatic phonograph, in combination, a magazine for records, a player unit having a rotatable record support for holding a record in playing position, said magazine and player unit being relatively movable to bring any record in the magazine into cooperative relation with the player unit, a player arm, means for supplying a record from said magazine to said record support, the player arm being on one side of said playing position and the record support being on the other side of said playing position, means pivotally supporting said unit, on an axis parallel to the plane of the record in said playing position, and means for rotating said unit on said axis through approximately half a revolution whereby the relation of the player unit and record supporting means to the playing position is reversed and the phonograph is adapted to play either or both sides of the record.

11. In an automatic phonograph, in combination, a magazine supporting a plurality of records in vertical and spaced relation, a player unit including a turntable and a player arm, a carriage for said player unit arranged to move to and fro along the magazine so as to locate said player unit in cooperative relation with any record in the magazine, said player unit being pivotally mounted on said carriage for rotation, on an axis parallel to the plane of a record in playing position, through approximately half a revolution into two operative positions, in each of which it is adapted to play an individual side of a record, means effective at the end of each to or fro travel for thus rotating the player unit from one position to another, a pair of selector means corresponding to the sides of each record and each arranged for movement into a displaced selecting position, a rocking member having two contacts one adapted to engage displaced selector members corresponding to the left hand sides of records and the other adapted to engage displaced selector members corresponding to right hand sides of records, means effective at the end of each to and fro travel for swinging said rocking member to render its other contact effective, and means controlled by the engagement of a contact with a selector member for arresting said carriage and transferring the corresponding record for reproduction.

12. In an automatic phonograph, in combination, a magazine for records, a player unit including a turntable and a player arm, said magazine and player unit being relatively movable to bring any record in the magazine into cooperative relation with the player unit, means for supplying a record from said magazine to said turntable, means for rotating said player unit, on an axis parallel to the plane of said record in playing position, through substantially half a revolution into either of two positions, in which the relation of the instrumentalities of the player unit to the record supplying means is reversed so that either side of the record can be reproduced.

13. In an automatic phonograph, in combination, a magazine, a carriage arranged to move along said magazine, a player unit pivotally mounted on said carriage, said unit including a turntable and a player arm, means for rotating said player unit, on an axis parallel to the planes of the records in the magazine, through substantially half a revolution so as to reverse its relation to the magazine, and automatic means on said player unit for mounting a record thereon, reproducing a side thereof and releasing said record.

14. In an automatic phonograph, in combination, a magazine, a carriage arranged to move along said magazine, a player unit pivotally mounted on said carriage, said unit including a turntable and a player arm, means for rotating said player unit, on an axis parallel to the planes of the records in the magazine, through substantially half a revolution so as to reverse its relation to the magazine, means for supplying a record from the magazine to the player unit, means on said player unit, controlled by said supplying means, for securing a record in playing position on said unit, automatic means on said unit for releasing a played record, and means actuated by said unit for initiating the operation of said supplying means to effect return of the played record to the magazine.

15. In an automatic phonograph, in combination, a carriage movable to and fro in a path, a player unit pivotally mounted on said carriage for rotation through 180°, said unit including a turntable and a player arm, and means effective at each end of said path to reverse the travel of the carriage and rotate the player unit through 180°.

16. In an automatic phonograph, in combination, a magazine, a player unit including a turntable and a player arm, power means, means for driving said unit bodily in a path along said magazine, means for rotating said player unit 180° about an axis parallel to the plane of a record in playing position, means for supplying a record from the magazine to the player unit and vice versa, a pair of clutches alternately connecting the power means to the driving and supplying means, a switch on said carriage, selector means arranged to engage and actuate said switch at various positions of the player unit, and a solenoid controlled by said switch to disconnect the drive means from the power means and connect the power means to the supplying means.

17. In an automatic phonograph, in combination, a magazine, means for transferring any record in the magazine into its corresponding playing position, a player unit including a turntable and a player arm, a drive means for moving said unit along said magazine, means for rotating said player unit 180° about an axis parallel to the plane of a record in playing position, power means for actuating said drive means, movable clutch means having two positions to effect actuation of said drive means in either of two directions, and means for moving said clutch means into neutral position to terminate said drive.

18. In an automatic phonograph, in combination, a magazine, means for transferring any record in the magazine into its corresponding playing position, a player unit including a turntable and a player arm, a drive means for moving said unit along said magazine, means for rotating said player unit 180° about an axis parallel to the plane of a record in playing position, power means for actuating said drive means, movable clutch means having two positions to effect actuation of said drive means in either of two directions, means effective at the end of the travel in one direction for moving said clutch member from one extreme position to the other, and means for moving said clutch means into neutral position to terminate said drive.

19. In an automatic phonograph, in combination, a magazine, a player unit including a turntable and a player arm, a drive means for moving said unit along said magazine, means for rotating said player unit 180° about an axis parallel to the plane of a record in playing position, power means for actuating said drive means, movable clutch means having two positions to effect actuation of said drive means in either of two directions, means for moving said clutch means into neutral position to terminate said drive, means for supplying a record from the magazine to the player unit and vice versa, and a second clutch member connecting said power means to said supplying means, said clutch actuating means being connected to said second clutch member to cause it to engage when the first clutch member is disengaged, and vice versa.

20. In an automatic phonograph, in combination, a magazine, a player unit including a turntable and a player arm, a drive means for moving said unit along said magazine, means for rotating said player unit 180° about an axis parallel to the plane of a record in playing position, power means for actuating said drive means, movable clutch means having two positions to effect actuation of said drive means in either of two directions, means for moving said clutch means into neutral position to terminate said drive, means for supplying a record from the magazine to the player unit and vice versa, a second clutch member connecting said power means to said supplying means, said clutch actuating means being connected to said second clutch member to cause it to engage when the first clutch member is disengaged, and vice versa, switch means for deenergizing said power means when the supplying means has been actuated to supply a record to the player unit, and means on the playing unit for initiating the operation of said motor means to resume the drive of the supplying means to return the played record to the magazine.

21. In an automatic phonograph, in combination, a magazine, a carriage arranged to move along said magazine, a player unit including a turntable and a player arm pivotally mounted on said carriage, means for rotating said player unit about an axis parallel to the planes of the records in the magazine through substantially half a revolution so as to reverse its relation to the magazine, means for supplying a record from said magazine to said unit, and automatic means on said player unit for mounting the record thereon, reproducing a side thereof and releasing said record.

22. In an automatic phonograph, in combination, a magazine, a carriage mounted for movement to and fro along a magazine, a player unit including a turntable and a player arm pivotally mounted on said carriage, said unit being movable about an axis parallel to the plane of a record in playing position through substantially half a revolution into either of two opposite record playing positions, a plurality of displaceable selector members, each corresponding to a recording on one side of a record, contacting means on said carriage arranged to engage actuated selector members corresponding to left hand sides of the records when the carriage is moving in one direction, second contacting means arranged to engage actuated selector members corresponding to right hand sides of the records when the carriage is moving in the other direction, drive means for said carriage including a motor and a clutch member movable into two engaged positions to effect the drive of the carriage in the opposite directions, electromagnetic means arranged to be energized by an engagement of one of said contacting means with an actuated selector member and arranged to move said clutch member to neutral position, movable means for biasing said clutch member towards one engaged position or the other, supplying means for transferring a record from the magazine to the player unit and vice versa, a second clutch means arranged to connect said motor to said record supplying means, last said clutch means being actuated by said electromagnetic means so as to be engaged when the first mentioned clutch member is in neutral position and vice versa, latch means for maintaining said electromagnetic means in the position into which it is actuated, switch means associated with the record supplying means for opening the circuit of the motor when a record is supplied to the player unit, switch means controlled by the player unit at the end of the playing of a record for causing the motor to resume operation to return the record to the magazine, and means associated with said record supplying means for unlatching said latch to cause resumption of the drive of said carriage, and means effective at the end of travel of the carriage to move said biasing means from one position to the other, to rotate the player unit from one playing position to the other, and for rendering one contacting member operative and the other contacting member inoperative.

23. In an automatic phonograph, in combination, a carriage, motor means for driving said carriage to and fro in a fixed path, a player unit rotatably mounted on said carriage, said unit including a turntable and a player arm, stop means for limiting the rotation of the player unit to approximately half a revolution, means for rotating said player unit, and stationary abutment means mounted at each end of said fixed path and adapted to engage and actuate said rotating means at each end of the carriage travel to rotate said player unit the full amount permitted by said stop means.

24. In an automatic phonograph, in combination, a carriage, motor means for driving said carriage to and fro in a fixed path, a player unit rotatably mounted on said carriage, said unit including a turntable and a player arm, stop means for limiting the rotation of the player unit to approximately half a revolution, means for rotating said player unit, stationary abutment means mounted at each end of said fixed path and adapted to engage and actuate said rotating means at each end of the carriage travel to rotate said player unit the full amount permitted by said stop means and overcenter spring means effective between the carriage and player unit for maintaining said player unit in the position into which it is moved and against the action of said stop means.

References Cited in the file of this patent

UNITED STATES PATENTS

| | | |
|---|---|---|
| 1,843,140 | Mills | Feb. 2, 1932 |
| 1,867,688 | Van Hook | July 19, 1932 |
| 2,281,547 | Andrews | May 5, 1942 |
| 2,281,548 | Andrews | May 5, 1942 |
| 2,293,219 | Rieber | Aug. 18, 1942 |
| 2,306,045 | Delano | Dec. 22, 1942 |
| 2,458,496 | Andrews | Jan. 11, 1949 |
| 2,463,050 | Pasternack | Mar. 1, 1949 |
| 2,501,391 | Karp | Mar. 21, 1950 |
| 2,521,046 | Darwin | Sept. 5, 1950 |
| 2,531,374 | Andrews | Nov. 21, 1950 |
| 2,683,870 | Cooper et al. | July 13, 1954 |